US006578958B2

(12) United States Patent
Gotoh et al.

(10) Patent No.: US 6,578,958 B2
(45) Date of Patent: Jun. 17, 2003

(54) INKJET RECORDING METHOD AND APPARATUS AND INK THEREFOR

(75) Inventors: Akihiko Gotoh, Atsugi (JP); Akiko Bannai, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 27 days.

(21) Appl. No.: 10/102,890

(22) Filed: Mar. 22, 2002

(65) Prior Publication Data

US 2003/0076394 A1 Apr. 24, 2003

(30) Foreign Application Priority Data

Mar. 22, 2001 (JP) ....................................... 2001-083297

(51) Int. Cl.$^7$ ........................ G01D 11/00; C09D 11/100
(52) U.S. Cl. ..................................... 347/100; 106/31.85
(58) Field of Search ................. 347/100; 106/31.6–31.9

(56) References Cited

U.S. PATENT DOCUMENTS

| | | | |
|---|---|---|---|
| 5,514,208 | A | 5/1996 | Nagai et al. |
| 5,619,765 | A | 4/1997 | Tokita et al. |
| 5,622,550 | A | 4/1997 | Konishi et al. |
| 5,782,254 | A | 7/1998 | Tanikawa et al. |
| 5,810,915 | A | 9/1998 | Nagai et al. |
| 5,851,717 | A | 12/1998 | Tsubuko et al. |
| 5,879,439 | A | 3/1999 | Nagai et al. |
| 5,882,390 | A | 3/1999 | Nagai et al. |
| 5,968,301 | A | 10/1999 | Murakami et al. |
| 5,972,082 | A | 10/1999 | Koyano et al. |
| 5,993,524 | A | 11/1999 | Nagai et al. |
| 6,020,103 | A | 2/2000 | Tsubuko et al. |
| 6,120,589 | A | 9/2000 | Bannai et al. |
| 6,231,652 | B1 | 5/2001 | Koyano et al. |
| 6,261,349 | B1 | 7/2001 | Nagai et al. |
| 6,439,713 | B1 | 8/2002 | Noguchi et al. |

FOREIGN PATENT DOCUMENTS

| | | |
|---|---|---|
| JP | 8-501330 | 2/1996 |
| JP | 10-095941 | 4/1998 |
| JP | 10-195360 | 7/1998 |
| JP | 10-279869 | 10/1998 |
| JP | 10-330665 | 12/1998 |
| JP | 11-080639 | 3/1999 |
| JP | 11-091086 | 4/1999 |
| JP | 2000-026779 | 1/2000 |

*Primary Examiner*—John Barlow
*Assistant Examiner*—Michel S Brooke

(57) ABSTRACT

An inkjet recording apparatus including (A) a recording head including: plural nozzles discharging an ink drop to form an image on a receiving material; and plural pressure generators applying a pressure to the corresponding nozzles; (B) an ink container containing the ink, wherein the ink includes a pigment and a volatile solvent, and wherein the ink has a pigment content decreasing property such that the pigment content decreases at a meniscus portion of the ink in the nozzles when the ink is allowed to settle; and (C) a driver selectively actuating the pressure generators to discharge the ink from the corresponding nozzles, wherein the driver selectively actuates at least one of the pressure generators at a predetermined timing such that the ink at the meniscus portion is vibrated to an extent such that the ink is not discharged from the corresponding nozzle.

20 Claims, 11 Drawing Sheets

INKJET RECORDING METHOD AND APPARATUS AND INK THEREFOR

BACKGROUND OF THE INVENTION

1. Field of the Invention

The present invention relates to an inkjet recording method and apparatus and ink therefor.

2. Discussion of the Background

Recently, inkjet recording methods in which a liquid ink is discharged from a nozzle to form an image on a receiving material have rapidly been in widespread use for printers which output images prepared by computers or the like because of having the following advantages:

(1) images can be formed on plain papers;
(2) color images can be easily produced;
(3) printers can produce images at low noise; and
(4) power consumption of the inkjet recording apparatus is relatively low.

Recently, as the inkjet recording techniques have been improved, color images as good as photographs can be produced by inkjet recording methods. With the rapid progress of the inkjet recording methods, the following needs exist for the inkjet recording methods:

(1) to produce images having good water and light resistance;
(2) to produce images having good durability; and
(3) to stably discharge ink drops at a high speed.

Currently, water-soluble dyes are typically used as the colorant of inkjet inks. When a water soluble dye is used as the colorant, the resultant images have poor light resistance because water-soluble dyes typically have a poor light resistance. In addition, the resultant images tend to have a poor water resistance.

In attempting to solve the light and water resistance of ink images, aqueous inks including a pigment have been proposed because pigments have better light and water resistance than water-soluble dyes. Images recorded by pigment inks have better light and water resistance than those recorded by dye inks. However, color tone and saturation of images recorded by pigment inks are inferior to those of images recorded by dye inks. Namely, color reproducibility of the full color images formed by pigment inks is inferior to that of the images formed by dye inks. In addition, since images recorded by pigment inks have low transparency, the projected images of the images formed on an OHP (overhead projection) sheet by pigment inks has a drawback of being unclear.

For the above-mentioned reasons, pigment inks have been used only for the application in which images are formed on a special paper to produce images having good light and water resistance. Namely, pigment inks cannot record high quality images on a plain paper at a high speed.

Inkjet inks are required to have a property such that drops of the inks are stably discharged from fine nozzles of an inkjet recording head. In other words, it is needed for inkjet inks that the ink present at the exit of a nozzle does not thicken or solidify due to the evaporation of the solvent therein. With respect to the thickening and solidification, pigment inks are inferior to dye inks. In addition, the solidified pigment inks cannot be easily re-dispersed in the inks. Therefore, a clogging problem in that a nozzle of an inkjet recording head is clogged with a material such as solidified inks included in an ink tends to occur when printing is suspended for a long period of time. When printing is suspended for a while or printing a document having a long blank area, pigment inks tend to thicken due to evaporation of the solvent therein, and thereby ink drops are discharged to an undesired direction, resulting in formation of undesired images (hereinafter this problem is sometimes referred to as poor periodic discharge stability) In addition, when a pigment ink is discharged from a nozzle which has suspended to discharge the ink for a while, a problem (hereinafter referred to as a paled image problem) occurs such that the resultant images have a low density or pale color tone because the pigment content of the ink drops decreases due to deposition of the pigment.

In order to stably discharge drops of a pigment ink, the dispersibility of the pigment needs to be improved. Therefore, various surfactants and polymer dispersants have been investigated to determine whether such materials can be used as dispersants for pigment inks. In addition, self-dispersion pigments in which a hydrophilic group is incorporated on the surface of a pigment have been proposed in attempting to prepare pigment inks without a dispersant (for example, Japanese Laid-Open Patent Publications Nos (hereinafter JOPs) 10-195360 and 10-330665).

However, the periodic discharge stability of such pigment inks is not satisfactory, although the clogging problem can be fairly solved. In particular, when such pigment inks are discharged from nozzles having a small diameter, problems such that the ink discharging direction often changes and the ink discharging speed decreases occur. In addition, these inks never solve the paled image problem.

In attempting to improve the periodic discharge stability of a pigment ink, JOP 11-80639 discloses a combination technique in which an ink including a carbon black on which a hydrophilic group is grafted by a physical or chemical treatment, and one of acetylene glycol to which ethylene oxide or propylene oxide is added, polyoxyethylene alkyl ether or polyoxyethylene polyoxypropylene alkyl ether is used for a recording method in which a piezoelectric element is moved such that the ink drop is not discharged from a nozzle. However, the evaluation results of the periodic discharge stability of the ink in the system are not described therein and therefore it is not clear that the graft carbon is effective for improving the periodical discharge stability. In addition, the details of the graft carbon are not described therein. Further, whether or not the ink causes the paled image problem is not described therein.

JOP 10-95941 discloses an inkjet recording method in which an ink including a pigment capable of being dispersed without a dispersant and a specific glycol ether is contacted with a reaction liquid to form an image without blurring on a recycled paper. JOP 10-95941 also discloses a technique in which a piezoelectric element is moved (hereinafter referred to as non-discharge driving) such that the ink is not discharged to agitate the ink and to prevent the ink from thickening. However, the effect of moving the piezoelectric element is unknown judging from the examples described in JOP 10-95941.

In general, pigment inks dry and thicken such that the inks exhibit non-Newtonian flow when the pigment inks are contained in open nozzles from which drops of the inks are not discharged for a while. Namely, it is needed to always apply a driving voltage to nozzles to improve the periodic discharge stability of pigment inks, however this measure shortens the life of the recording head. In addition, JOP 10-95941 does not describe the paled image problem and therefore measures against the paled image problem are not disclosed.

With respect to the paled image problem of pigment inks, Japanese Laid-Open Ko-hyo Patent Publication 08-501330

(i.e. WO94-03546) describes that as a volatile solvent in an ink present in the vicinity of the tip edge of a nozzle evaporates, condensed products of the ink (i.e., the colorant and low volatile materials) are built up at the tip edge. Subsequently, the pigment moves toward the inside of the nozzle because the pigment has a better affinity for the ink present therein. WO94-03546 only describes that by using such an ink, the clogging problem can be solved. Namely, the paled image problem is not discussed therein.

JOP 10-279869 discloses that by using an ink having a property such that phase separation occurs at a meniscus portion of the ink in a nozzle, reliability of the inkjet apparatus can be improved. JOP 11-91096 discloses that by using such an ink and in addition by disposing of the paled ink in a nozzle in a proper amount before recording images, formation of undesired images can be prevented. However, when disposing of the paled ink, the carriage having a recording head has to be moved to a non-image forming position under which a receiving material is not present. Therefore this technique is not suitable for high speed recording. In particular, when nozzles having a small diameter are used, the ink therein is very rapidly paled. Therefore, the ink disposing operation (hereinafter sometimes referred to as an idle-discharging operation) has to be frequently performed for each nozzle which suspends to discharge the ink for a while. Therefore the technique is not practical.

JOP 2000-26779 discloses a pigment ink having a specific storage modulus and zeta potential. It discloses a pigment ink having good preservation property, however, it does not describe measures against the paled image problem and poor periodic discharge stability. When the present inventors reproduce the ink disclosed therein to evaluate the ink with respect to the paled image problem and periodic discharge stability, the ink has a poor periodic discharge stability, i.e., the ink has a drawback in that the ink in a nozzle from which ink drops are not discharged for a while is discharged in an undesired direction (an undesired discharge problem).

Because of these reasons, a need exists for an inkjet ink apparatus which can stably record high quality images without causing the undesired discharge problem and paled image problem even when the apparatus is used under various usage conditions.

SUMMARY OF THE INVENTION

Accordingly, an object of the present invention is to provide an inkjet recording method and apparatus and ink cartridge by which high quality images can be stably produced without causing the undesired discharge problem and paled image problem even when the apparatus (or the cartridge) is used under various usage conditions such that images are recorded after a long or short pause (namely, the apparatus has good periodic discharge stability).

Another object of the present invention is to provide an inkjet recording method and apparatus and ink cartridge by which high quality images can be stably recorded even when the apparatus (or the ink cartridge) uses nozzles having a small diameter.

Yet another object of the present invention is to provide an inkjet recording method and apparatus and ink cartridge by which high quality images can be stably recorded even when the images are recorded at a high speed.

Briefly these objects and other objects of the present invention as hereinafter will become more readily apparent can be attained by an inkjet recording apparatus including (A) a recording head including plural nozzles configured to selectively discharge a drop of an ink to form an image at an image forming area, and plural pressure generators configured to selective apply a pressure to the corresponding nozzles of the plural nozzles, from which the ink drop is discharged to form the image; (B) an ink container configured to contain the ink, wherein the ink includes a pigment, a volatile solvent (having a vapor pressure not less than 1 mmHg at 25° C.) and a solvent having a low volatility (which has a vapor pressure less than 1 mmHg at 25° C.), and wherein the ink has a property such that the pigment content decreases at a meniscus portion of the ink in the plural nozzles when the ink is allowed to settle; (C) a driver configured to actuate at least one of the plural pressure generators by applying a first pulse to selective discharge the ink from the discharging nozzle, wherein the driver actuates at least one of the plural pressure generators at a predetermined timing by applying a second pulse to selectively vibrate the ink at the meniscus portion to an extent such that the ink is not discharged from the nozzle (hereinafter this operation is sometimes referred to as non-discharge driving).

The ink preferably has a zeta potential not less than 20 mV (absolute value) and a property such that when the pigment content of the ink increases from 1.25 to 1.50 times the pigment content of the original ink due to evaporation of at least the volatile solvent, the absolute value of the zeta potential of the condensed ink is less than that of the original ink by at least 5 mV.

It is preferable that the volatile solvent preferably includes water, and the pigment of the ink includes particles having a surface with which an ionic group is connected optionally with a connecting group therebetween so that the pigment can be well dispersed in water.

The nozzles preferably have a diameter not greater than 25 $\mu$m.

The inkjet recording apparatus preferably satisfies the following relationship:

$$E/w \leqq 5\times10^{-8} (J/pg)$$

wherein w represents the weight of the ink drops discharged from the recording head to which an energy E is applied.

Each of the pressure generators preferably have a vibrating plate and an electrode opposing the vibrating plate, wherein the vibrating plate is deformed by utilizing an electrostatic force induced between the vibrating plate and the electrode to generate the pressure.

The inkjet recording apparatus preferably has a relative humidity detector configured to detect the relative humidity of the environment surrounding the inkjet recording apparatus, wherein the predetermined timing of actuating the pressure generators is determined based on the relative humidity and the pigment content decreasing property of the ink.

The actuating of the pressure generators is performed just before the ink discharging operation, wherein the number of the pulses applied during the non-discharge driving operation is from 10 to 5,000. The number of the second pulse is preferably determined based on the pause time and/or the conditions of the environment surrounding the inkjet recording apparatus.

The inkjet recording apparatus preferably has an idle-discharging mechanism configured to perform ink disposing operation at a location other than the image forming area. The idle-discharging mechanism preferably performs the ink disposing operation at an interval not less than 60 seconds.

As another aspect of the present invention, an inkjet ink is provided which includes a pigment at a first pigment content, a volatile solvent and a solvent having a low volatility and has a zeta potential not less than 20 mV (absolute value), wherein the ink further has a property such that when the pigment content of the ink increases from 1.25 to 1.50 times the first pigment content due to evaporation of at least the volatile solvent, the absolute value of the zeta potential of the condensed ink is less than that of the original ink by at least 5 mV.

It is preferable that the volatile solvent includes water, and the surface of particles of the pigment is connected with an ionic group optionally with a connecting group therebetween.

The ionic group is a cationic group selected from the group consisting of quaternary ammonium groups, quaternary alkylamine salt groups, pyridinium groups and phosphonium groups. Alternatively, the ionic group is an anionic group selected from the group consisting of —COOH, —$SO_3M$, —$PO_3M$, and —$PO_3M_2$, wherein M represents a hydrogen atom, an alkali metal, a quaternary ammonium group, a quaternary phosphnium group or an alkanol amine group.

As yet another aspect of the present invention, an inkjet recording ink cartridge is provided which includes at least an ink container containing an ink, wherein the ink is the inkjet ink mentioned above. The ink cartridge may further include a recording head having nozzles from which drops of the ink are discharged to form an image on a receiving material, wherein the nozzles have a diameter not greater than 25 $\mu$m.

As a further aspect of the present invention, a combination of yellow, magenta, cyan and black color inks is provided each of which includes a pigment surface having a surface connected with an ionic group optionally with a connecting group therebetween, a volatile solvent and a solvent having a low volatility and which has a zeta potential not less than 20 mV, wherein the ink further has a property such that when the pigment content of the ink increases from 1.25 to 1.50 times the pigment content of the original ink due to evaporation of at least the volatile solvent, the absolute value of the zeta potential of the condensed ink is less than that of the original ink by at least 5 mV.

It is preferable that the polarity of the ionic group connected with the surface of the pigment in the black ink is different from that of the ionic groups connected with the surfaces of the pigments of the yellow, magenta and cyan inks.

As a still further aspect of the present invention, an inkjet recording method is provided which includes the steps of selectively discharging an ink from nozzles to form an image on a receiving material, wherein the ink includes a pigment, a volatile solvent and a solvent having a low volatility and has a zeta potential not less than 20 mV and a property such that the pigment content decreases at a meniscus portion of the ink in a non-selected nozzle; and vibrating the ink at the meniscus portion to an extent such that the ink is not discharged from the nozzle.

The ink preferably has a property such that when the pigment content of the ink increases from 1.25 to 1.50 times the pigment content of the original ink by evaporation of the volatile solvent, the absolute value of the zeta potential of the condensed ink is less than that of the original ink by at least 5 mV.

It is preferable that the volatile solvent preferably includes water, and the pigment of the ink has an ionic group optionally with a connecting group therebetween.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1A:
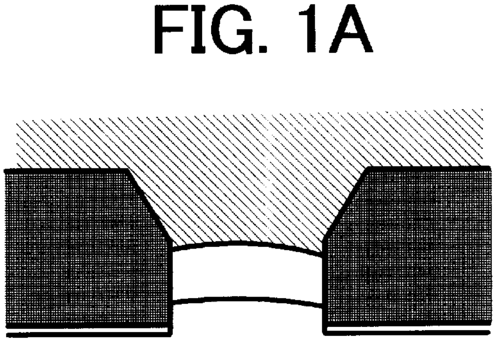
FIGS. 1A–1D are schematic views illustrating the behavior of an ink when a non-discharge driving operation is performed.

In the present invention, the ink contained in the ink container at least includes a pigment, a volatile solvent and a solvent having a low volatility and has a property such that the pigment content of the ink near the meniscus portion in a nozzle is lower than the pigment content of the ink located inside of the nozzle. When the pigment content decreasing phenomenon further proceeds, the ink near the meniscus portion in the nozzle causes phase separation such that the pigment is separated from the liquid components of the ink.

The reason for the pigment content decreasing phenomenon and phase separation phenomenon is considered to be that at a meniscus portion the volatile solvent tends to evaporate and therefore the pigment particles in the vicinity of the meniscus portion moves to the inside portions of the nozzle wherein the ink includes the volatile solvent in an amount greater than that at the meniscus portion because the pigment particles typically have affinity for the volatile solvent. These phenomena can be caused more certainly when the particles included in the ink have a zeta potential (absolute value) not less than about 20 mV. When the zeta potential is too low, the electric repulsion of the particles is low, resulting in coagulation of the particles at the meniscus portion, and thereby the particles tend not to move toward inside portions of the nozzle.

When the zeta potential is too high, aggregation of the particles can be prevented due to the electric repulsion of the particles, and the particles moves toward the inside portions of the ink which include the volatile solvent in an amount greater than that at the meniscus portion and in which the particles can be stabilized.

In the present invention, the zeta potential can be determined by a so-called ESA method in which the pressure generated by the vibration of particles which are located under a high frequency alternative electric field formed between a pair of electrodes.

The ink near the meniscus, which has a low pigment content or hardly includes a pigment, has a relatively low viscosity even when the volatile solvent therein has evaporated. In addition, although the ink inside the nozzle has a high pigment content due to movement of the pigment from the meniscus portion, the ink inside the nozzle maintains a Newtonian flow. Therefore, by using an ink having such a property, ink drops can be stably discharged from nozzles even when the discharging from the nozzles is suspended for a long or short period of time.

However, since the ink having such a property has a low pigment content at the meniscus portion, the paled image problem such that the resultant images are pale colored or non-colored occurs if the ink is discharged without any action.

In the present invention, by using the ink having such a property and a method in which non-discharge driving in which the ink at the meniscus portion is vibrated by driving the corresponding pressure generator to an extent such that the ink is not discharged from the nozzle, the paled image problem can be prevented because the ink at the meniscus portion is easily. mixed with the ink inside the nozzle. Since the ink is mixed in the nozzle, the viscosity of the ink to be discharged hardly increases and the ink can be discharged as ink drops. In addition, the ink at the meniscus portion and the ink inside the nozzle have a low viscosity and exhibit Newtonian flow, and therefore period and number of the non-discharge driving operation performed in the inkjet recording apparatus of the present invention is much less than those of the conventional non-discharge driving operations performed for preventing increase of the viscosity of the ink used. Therefore, such a non-discharge driving operation hardly has an adverse effect on the durability of the recording head.

FIGS. 1A to 1D are schematic views illustrating behavior of the ink at a meniscus portion when a non-discharge driving operation is performed.

Figure 1B:
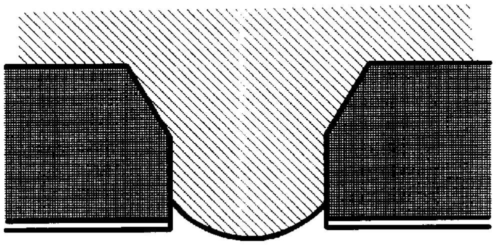
Figure 1C:
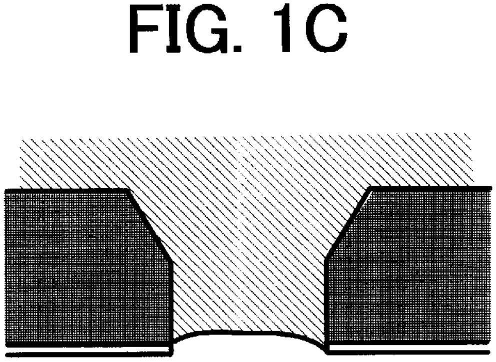
Figure 1D:
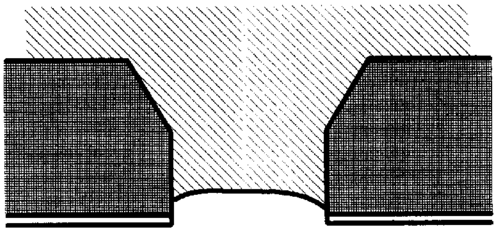

FIG. 1A is a schematic view illustrating an ink which causes a phase separation at a meniscus portion M of the ink in a nozzle when the nozzle is in a non-discharge state. If the ink is discharged to form an image without any action, a transparent ink drop or a pale-colored ink drop is discharged from the nozzle. FIGS. 1B and 1C are schematic views illustrating the behavior of the ink (i.e., vibration of the ink at the meniscus portion) when a non-discharge driving operation is performed, i.e., when a piezoelectric element is driven by a driving pulse such that the ink is not discharged from the nozzle. In FIGS. 1B and 1C, the process how the transparent ink at the meniscus portion is mixed with the ink inside the nozzle is not shown. Thus, by vibrating the ink at the meniscus portion such that the ink is not discharged from the nozzle, the phase-separated ink disappears and the ink achieves a uniform state as shown in FIG. 1D.

In the present invention, the volatile solvent is defined as a solvent having a vapor pressure not less than 1 mmHg at 25° C. Specific examples of such volatile solvents include water; lower alcohols such as methanol, ethanol, butanol and isopropanol; ketones; etc. It is preferable that water is used as the main component of the low volatile solvent.

The ink of the present invention preferably includes a solvent having a low volatility, which is defined as a solvent having a vapor pressure less than 1 mmHg at 25° C. The functions of the solvent having a low volatility are as follows:

(1) a function as a humectant to prevent solidification of the ink, i.e., to prevent a clogging problem;

(2) a function to accelerate the movement of the pigment particles at the meniscus portion toward the inside portion of the nozzle in the process that the volatile solvent evaporates; and (3) a function to dissolve a penetrant in the ink.

Therefore, it is preferable to use a combination solvent of water with one or more of the following volatile solvents having an affinity for water. At this point, the interaction of the combination solvent with the hydrophilic group of the pigment used or hydrophilizing agent for the pigment should be considered in order that the resultant ink has a zeta potential not less than 20 mV.

Specific examples of the volatile solvents include polyhydric alcohols such as ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, and petriol; alkyl, ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monophenyl ether, and ethylene glycol monobenzyl ether; nitrogen-containing alicyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanol amine, diethanol amine, triethanol amine, monoethylamine, diethylamine, and triethylamine; sulfur-containing compounds such as dimethyl sulfoxide, sulforane, and thiodiethanol; propylene carbonate, ethylene carbonate, etc.

The content of the solvent having a low volatility in the ink composition is from 5 to 50% by weight, and preferably from 8 to 30% by weight. When the content is too low, the water-evaporation preventing effect is insufficient, and the function to dissolve the penetrant is insufficient. Therefore problems such that the preservation property and discharge stability of the ink deteriorate occur. In contrast, when the content is too high, the viscosity of the ink increases, and thereby the discharge stability of the ink is deteriorated.

In the present invention, the ink preferably has a property such that when the volatile solvent therein evaporates and the pigment content of the ink increases from 1.25 to 1.50 times that of the original pigment content, the zeta potential (absolute value) of the ink decreases by not less than 5 mV. The inkjet recording apparatus using such an ink has good periodic discharge stability. When the zeta potential of an ink largely change as the volatile solvent of the ink evaporates, the pigment particles in the ink easily moves, i.e., the transparentization of the meniscus portion of the ink can be promoted, because the zeta potential becomes a driving force therefor. Even when the zeta potential change is large, the periodic discharge stability cannot be improved if the original zeta potential of the ink is small. This is because the pigment particles coagulate at the meniscus portion as the volatile solvent evaporates and thereby the movement of the pigment particles does not occur (i.e., the transparentization of the meniscus portion of the ink does not occur) and the viscosity of the ink at the meniscus potion increase, resulting in deterioration of periodic discharge stability.

Suitable pigments for use in the ink includes known inorganic pigments and organic pigments. Specific examples of the inorganic pigments include titanium oxide, iron oxide, calcium carbonate, barium sulfate, aluminum hydroxide, barium yellow, cadmium red, chrome yellow, and carbon blacks manufactured by a known method such as contact methods, furnace methods and thermal methods.

Specific examples of the organic pigments include azo pigments (which include azo lakes, insoluble azo pigments, condensed azo pigments, chelated azo pigments, etc.), polycyclic pigments (for example, phthalocyanine pigments, perylene pigments, perynone pigments, anthraquinone pigments, quinacridone pigments, dioxadine pigments, indigo pigments, thioindigo pigments, isoindolinone pigments, quinophthalone pigments, etc.), dye chelates (for example, basic dye chelates, acidic dye chelates, etc.), nitro pigments, nitroso pigments, aniline black, etc.

Specific examples of the black pigments include carbon black (C.I. Pigment Black 7) such as furnace black, acetylene black and channel black; metal and metal compounds such as copper, iron (C.I. Pigment Black 11), and titanium oxide; and organic pigments such as Aniline Black.

Specific examples of the color pigments include C.I. Pigment Yellow 1, 3, 12, 13, 14, 17, 24, 34, 35, 37, 42 (i.e., yellow iron oxide), 53, 55, 81, 83, 95, 97, 98, 100, 101, 104, 408, 109, 110, 117, 120, 128, 138, 150, 151, 153, and 183; C.I. Pigment Orange 5, 13, 16, 17, 36, 43 and 51; C.I. Pigment Red 1, 2, 3, 5, 17, 22, 23, 31, 38, 48:1, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15 (Phthalocyanine Blue), 15:1, 15:2, 15:3 (Phthalocyanine Blue), 16, 17:1, 56, 60 and 63; C.I. Pigment Green 1, 4, 7, 8, 10, 17, 18 and 36; etc.

In order to prepare an ink which includes such a pigment and which has a good dispersing property and discharge stability, the particle diameter of the pigment particles, which may be subjected to a treatment such as surface treatments, dispersion treatments and classification treatments, is preferably controlled so as to be from 10 nm to 600 nm. When large pigment particles having a particle diameter greater than 600 nm are included in an ink such that such large pigment particles can be detected by a particle diameter measuring instrument, the ink has poor dispersion stability. In addition, the ink tends to cause coagulation of the pigment when being preserved, and nozzles are choked with the coagulated particles, resulting in deterioration of discharge property of the ink. The average particle diameter of the ink of the present invention is preferably controlled so as to be from 50 nm to 200 nm.

When the average particle diameter of the pigment included in an ink is too large, the dispersion stability of the ink deteriorates. In addition, the color tone (particularly, the color saturation) of the ink deteriorates. In contrast, when the average particle diameter is too small, a penetration problem in that the pigment particles in an ink image formed on a receiving paper penetrates into the receiving paper and reaches the backside of the receiving paper tends to occur, although such an ink has good dispersion stability.

At this point, the average particle diameter is defined as a 50% particle diameter on an accumulated volume basis. In other words, the accumulated volume of particles having a particle diameter not greater than the 50% particle diameter is 50% of the total volume of all the particles in an ink. The 50% particle diameter on an accumulated volume basis is determined, for example, by the following dynamic light scattering method:

(1) irradiating particles in an ink, which perform Brownian motion, with laser light; and (2) the particle diameter is determined by the change of the frequency of the light reflecting from the particles (i.e., back scattering light) using Doppler scattered light analysis.

In the present invention, pigments which are subjected to a surface treatment are preferably used. For example, grafted pigments whose surface is treated with a resin or the like so as to be able to be dispersed in water; microencapsulated pigments in which a pigment is microencapsulated so as to be able to be dispersed in water; and the like treated pigments can be used. Among these treated pigments, pigments having a surface having an ionic group optionally with a connecting group therebetween are preferably used. Such pigments can be stably dispersed in water without using a dispersant in the dispersion process mentioned below. In addition, the pigment particles in an ink do not coagulate in the process that the volatile solvent in the ink evaporates, and thereby the pigment particles easily move and the meniscus portion of the ink can be easily transparentized.

As the ionic group of the treated pigments, cationic groups and anionic groups can be used.

Specific examples of the cationic groups include quaternary ammonium groups, quaternary alkyl amine salt groups, pyridinium groups, phosphonium groups and the like groups. When a color ink which is treated with a cationic group and another color ink which is treated with an anionic group are used for forming color images, a color bleeding problem in which the boundary portion of the color images formed by the inks on a receiving paper blurs can be prevented.

Specific examples of the anionic groups which is connected with the surface of particles of a pigment include —COOH, —$SO_3M$, —$PO_3M$, —$PO_3M_2$, etc., wherein M represents a hydrogen atom, an alkali metal, a quaternary ammonium group, a quaternary phosphonium group, and an alkanol amine group. In particular, when a carboxyl group is used, not only the dispersion stability of the resultant ink is improved, but also the resultant images have good image qualities and good water resistance. In addition, when an alkali metal cation, a quaternary ammonium cation, a quaternary phosphonium cation, or an alkanol amine cation is used as the counter ion of the carboxyl group, the resultant ink has good dispersion stability and discharge stability. The reason is considered to be due to the hydration effect of the counter ion.

A pigment dispersion for use in the ink composition of the present invention is prepared, for example, by the following method. A pigment is mixed with a dispersant such as polymer dispersants and surfactants and a solvent including water to perform premixing. Then the mixture is dispersed using a known dispersing machine and then optionally subjected to a centrifugal separation treatment to control the particle diameter distribution and average particle diameter of the pigment. Thus a pigment dispersion is prepared.

Then an additive is added to the pigment dispersion to impart the desired properties to the pigment dispersion (i.e., the resultant ink). Thus the ink of the present invention is prepared. The content of the pigment in the ink is preferably from 0.5 to 15% by weight, and more preferably from 2 to 10% by weight, based on total weight of the ink.

Specific examples of the polymer dispersants include polyacrylic acid, polymethacrylic acid, acrylic acid-acrylonitrile copolymers, vinyl acetate-acrylate copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene- a -methylstyrene-acrylic acid copolymers, styrene-α-methylstyrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinyl ester-ethylene copolymers, vinyl acetate-maleic acid ester copolymers, vinyl acetate-crotonic acid copolymers, and vinyl acetate-acrylic acid copolymers; etc. Among these polymer dispersants, dispersants having a carboxyl group are preferably used to prepare an ink having good dispersion stability and to control the zeta potential of the ink so as to be in the preferable range mentioned above.

The weight average molecular weight (Mw) of these copolymers preferably is from 3,000 to 50,000, more preferably from 5,000 to 30,000 and even more preferably from 7,000 to 15,000.

The polymer dispersants are added in the ink alone or in combination in an amount such that the pigment used is stably dispersed and in addition the effects of the present invention are not deteriorated. The ratio (P/D) of the pigment (P) to the dispersant (D) is preferably from 1/0.06 to 1/3, and more preferably from 1/0.125 to 1/3.

Specific examples of the surfactant dispersants include nonionic surfactants such as sorbitane fatty acid esters, glycerin fatty acid esters, decaglycerin fatty acid esters, polyglycerin fatty acid esters, polyoxyethylene sorbitane fatty acid esters, polyoxyethylene sorbit fatty acid esters, polyoxyethylene glycerin fatty acid esters, polyoxyethylene glycol fatty acid esters, polyoxyethylene alkyl ether, polyoxyethylene polyoxypropylene alkyl ether, polyoxyethylene alkylphenyl ether, polyoxyethylene castor oil, polyoxyethylene lanolin/lanolin alcohol/bees wax derivatives and polyoxyethylene alkylamine fatty acid amides; and anionic surfactants such as alkyl sulfonates, polyoxyethylene alkylether sulfates, N-acylamino acid salts, N-acylmethyl taurine salts, polyoxyethylene alkylether acetates, α-olefin sulfonates, alkylphosphates and polyoxyethylene alkylether phosphates.

In particular, by using anionic surfactants including an ethylene oxide group, the resultant ink has good dispersion stability. In addition, at the meniscus portion of the ink in nozzles, the pigment content of the ink easily decreases and the phase separation phenomenon easily occurs. This is because the ethylene oxide group attracts water molecules.

In particular, by using compounds having one of the following formulae (1), (2) and (3) as the anionic surfactant having an ethylene oxide group, the resultant ink has dramatically improved dispersion stability.

$$R1O(CH_2CH_2O)_kCH_2COOM1 \quad (1)$$

$$R2O(CH_2CH_2O)_mSO_3M2 \quad (2)$$

$$R3O(CH_2CH_2O)_nPO(OM3)OM4 \quad (3)$$

wherein R1 represents an alkyl group having from 6 to 14 carbon atoms which is optionally branched; k is an integer of from 3 to 12; M1, M2 and M4 independently represent an alkali metal ion, a quaternary ammonium ion, a quaternary phosphonium ion, or an alkanol amine ion; R2 and R3 independently represent an alkyl group having from 4 to 24 carbon atoms, an alkylphenyl group or an alkylaryl group; M3 represents a hydrogen atom, or a group $R(CH_2CH_2O)_p$; m is an integer of from 4 to 50; and n and p are independently an integer of from 4 to 20.

In the compounds having one of formulae (1), (2) and (3), the group —COOM1, —$SO_3$M2 or —PO(OM3)OM4 dissociates and the zeta potential of the ink depends on the dissociation. In addition, since the oxyethylene group adjacent to these hydrophilic group attracts water molecules, the dissociation can be maintained even when water evaporates, and thereby the high zeta potential can be maintained.

The length of the oxyethylene chain and the alkyl chain of the compounds having one of formulae (1), (2) and (3) is determined depending on the pigment and volatile solvent used.

Specific examples of the compounds having formula (1), (2) or (3) include the following (the compounds are illustrated as a form of free acid), but are not limited thereto:

Compound (1)-1 $C_{13}H_{27}O(CH_2CH_2O)_3COOH$

Compound (1)-2 $C_{10}H_{21}O(CH_2CH_2O)_{12}COOH$

Compound (1)-3 $C_4H_9C_6H_5O(CH_2CH_2O)_{10}COOH$

Compound (1)-4 $C_3H_7C_6H_5O(CH_2CH_2O)_{12}COOH$

Compound (1)-5 $C_{13}H_{27}O(CH_2CH_2O)_6COOH$

Compound (2)-1 $C_8H_{17}O(CH_2CH_2O)_4SO_3H$

Compound (2)-2 $C_9H_{19}C_6H_5O(CH_2CH_2O)_{12}SO_3H$

Compound (2)-3 $C_2H_5(C_2H_5)C_{12}H_{25}C_6H_5O(CH_2CH_2O)_{24}SO_3H$

Compound (2)-4 $CH_3(CH_2)_7CH{=}CH(CH_2)_8O(CH_2CH_2O)_8SO_3H$

Compound (2)-5 $C_{12}H_{25}C_6H_5O(CH_2CH_2O)_8SO_3H$

Compound (3)-1 $CH_3(CH_2)_7CH{=}CH(CH_2)_8O(CH_2CH_2O)_8PO(OH)_2$

Compound (3)-2 $C_9H_{19}C_6H_5O(CH_2CH_2O)_3PO(CH_2CH_2O)_3OH$

Compound (3)-3 $C_{13}H_{27}O(CH_2CH_2O)_4PO(OH)_2$

These compounds can be used alone or in combination.

In addition, by using an alkali metal ion, a quaternary ammonium ion, a quaternary phosphonium ion or an alkanol amine ion is used as a counter ion of the anionic surfactants mentioned above, the resultant ink has good dispersion stability and discharge stability, which is considered to be caused by hydration of the counter ion.

In the ink of the present invention, nonionic surfactants having an ethylene oxide group can also be used other than the anionic surfactants mentioned above. Nonionic surfactants having an ethylene oxide group can be used alone, but it is preferable for the nonionic surfactants to be used in combination with one or more of the anionic surfactants mentioned above because nonionic surfactants have a cloud point. When a nonionic surfactant having a cloud point is used in combination with an anionic surfactant, the mixture does not have a cloud point or has an unclear cloud point. Therefore, the action of the oxyethylene chain of attracting water molecules does not deteriorate even when the mixture is preserved for a long period of time under environmental conditions in which temperature widely changes. The hydrophilic groups of nonionic surfactants are a nonionic group which does not ionize in water. Compounds having a (poly) oxyethylene group as the hydrophilic group; sorbitan, sucrose esters and monoglyceride, which have many hydroxyl groups as the hydrophilic group; etc. are well known as nonionic surfactants. Among these nonionic surfactants, compounds having a (poly)oxyethylene group are preferable because surfactants capable of exerting a high dispersing effect can be obtained. This is because the HLB of the surfactants can be freely changed by changing-the content of the (poly)oxyethylene group therein.

Specific examples of such nonionic surfactants include polyoxyethylene alkyl ethers, polyoxyethylene alkyl ally esters, polyoxyethylene alkyl phenyl ethers, polyoxyethylene glycol esters, polyoxyethylene polyoxypropylene glycol, polyoxyethylene ethers of a glycerin ester, polyoxyethylene ethers of a sorbitan ester, polyoxyethylene ethers of a sorbitol ester, polyoxyethylene fatty acid amides, polyoxyethylene alkyl amines, etc.

The ink of the present invention can include a penetrant. Suitable compounds for use as the penetrant in the ink of the present invention include polyols and glycol ethers having partial water solubility of from 0.99 to 28% by weight at 20° C. When the water solubility is too low, the compound tends to separate from the ink when the ink is preserved under environmental conditions such that temperature largely changes, and in addition the physical properties of the compound largely change. In contrast, when the water solubility is too high, the resultant ink has poor affinity for receiving papers, and thereby ink images formed on the receiving papers have poor drying property. The water solubility is preferably from 1 to 4.5% by weight.

Specific examples of the penetrants include 2-ethyl-1,3-hexanediol, ESTER DIOL 204(i.e., $HOCH_2C(CH_3)_2CH_2OCOC(CH_3)_2CH_2OH$), hexylcellosolve (i.e., $C_6H_{12}OCH_2CH_2OH$), hexylcarbitol (i.e., $C_6H_{13}O(C_2H_4O)_2H$), etc. Among these compounds, 2-ethyl-1,3-hexanediol is preferable. By including 2-ethyl-1,3-hexanediol in an ink, the resultant images hardly blur and the resultant ink has improved discharge stability and discharge response.

In order to provide an ink which has a good penetration property against receiving papers and good drying property and which can produce high quality images without blurring, another surfactant can be included in the ink. Specific examples of such surfactants include known ampholytic surfactants, nonionic surfactants, and anionic surfactants. Among these surfactants, anionic surfactants having an ethyleneoxide group are preferably used.

The content of such surfactants in the ink is preferably from 0.05 to 10% by weight, more preferably from 0.1 to 5% by weight, and even more preferably from 0.1 to 3% by weight. When the content is too low, the penetration property of the ink cannot fully improved. In contrast, when the content is too high, problems such that the viscosity of the resultant ink increases and the surfactant tends to separate from the ink tend to occur.

The ink of the present invention optionally includes an antiseptic agent, an antimildew agent, a pH controlling agent, an antioxydant, and an oxygen absorbent.

Then the recording head for use in the inkjet recording apparatus of the present invention will be explained.

The recording head includes at least plural nozzles configured to selectively discharge ink drops to form an image, and pressure generators which apply a pressure to the respective nozzles.

In the present invention, by non-discharge driving operation in which the ink of the present invention at the meniscus portion in a non-discharge nozzle is vibrated such that the ink is not discharged at least before the ink is discharged to form an image, the ink at the meniscus portion and the ink inside the nozzle can be mixed even when printing is suspended for a while and thereby the paled image problem can be avoided. This technique is especially effective for the nozzles having a diameter not greater than 25 $\mu$m. As the diameter of nozzles becomes small, pigment particles of the ink in the nozzles rapidly moves or the phase separation phenomenon occurs in a very short time. The time is on the order of a few seconds when a nozzle having a diameter of 20 $\mu$m is used and the environmental condition is 20° C. 50% RH.

Conventionally, the ink having a low pigment content or the phase-separated ink in nozzles is disposed of at a non-image area (this operation is hereinafter referred to as an idle-discharging operation). However, under low humidity conditions, the idle-discharging operation has to be performed at every carriage scanning. By using the technique of the present invention, the interval of the idle-discharging operation can be fully prolonged, and thereby the printing speed can be increased. At this point, the nozzle diameter means a diameter of a circle which has the same area as that of the nozzle which typically has a form other than a circle.

Suitable pressure generators include any means which apply mechanical energy to an ink to vibrate the ink at the meniscus portion (i.e., to perform a non-discharge driving operation) and to discharge the ink from nozzles (i.e., to perform the image printing operation). Specific examples of the pressure generators include piezoelectric recording heads using a piezoelectric element, and electrostatic recording heads in which a vibrating plate is deformed using electrostatic force and the mechanical energy is applied to an ink to discharge the ink.

In the present invention, the ratio (E/W) of the energy (E) applied to a recording head to the weight of the discharged ink (W) is preferably controlled so as to be not greater than $5\times10^{-8}$ J/pg. When a printer has such a ratio, power consumption of the resultant printer can be decreased, however, the printer tends to have poor discharge stability, particularly poor periodic-discharge stability. However, in the present invention, since the ink has such a specific property as mentioned above and in addition a driving means configured to operate the pressure generators which vibrate the ink at the meniscus portions in non-discharge nozzles such that the ink is not discharged is used, the inkjet recording apparatus has good discharge stability and periodic discharge stability.

Suitable recording heads for use in the image recording apparatus of the present invention, which have such an energy/ink drop ratio as mentioned above, include electrostatic recording heads having a pressure generators which generate a pressure by deforming a vibrating plate using electrostatic force generated between the vibrating plate and the respective electrode.

Then an embodiment of the inkjet recording apparatus of the present invention will be explained referring to drawings, but the inkjet recording apparatus of the present invention is not limited thereto.

Figure 2:
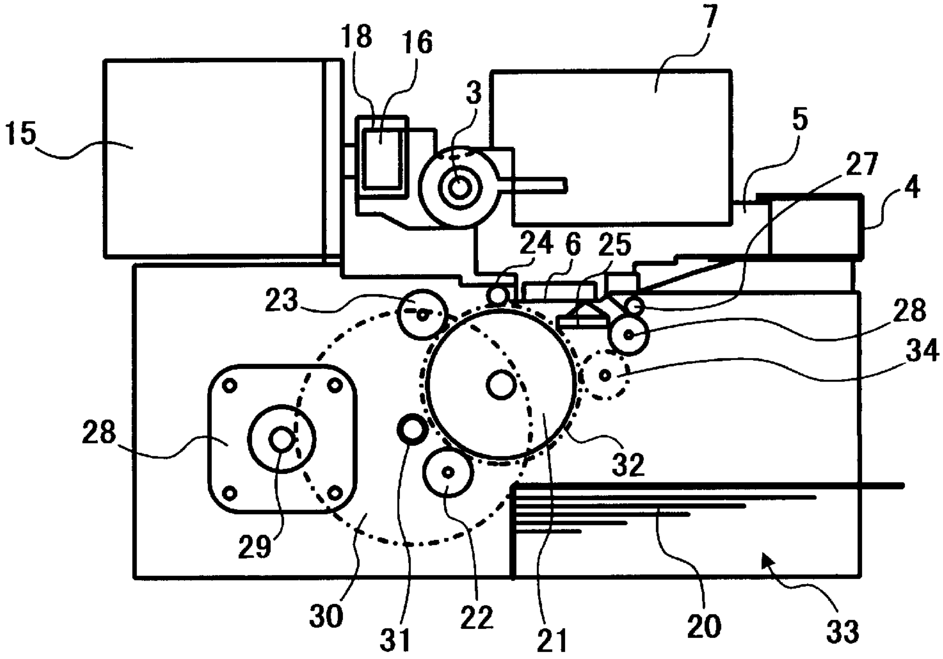
FIG. 2 is a schematic view illustrating the cross section of an embodiment of the inkjet recording apparatus of the present invention.
Figure 3:
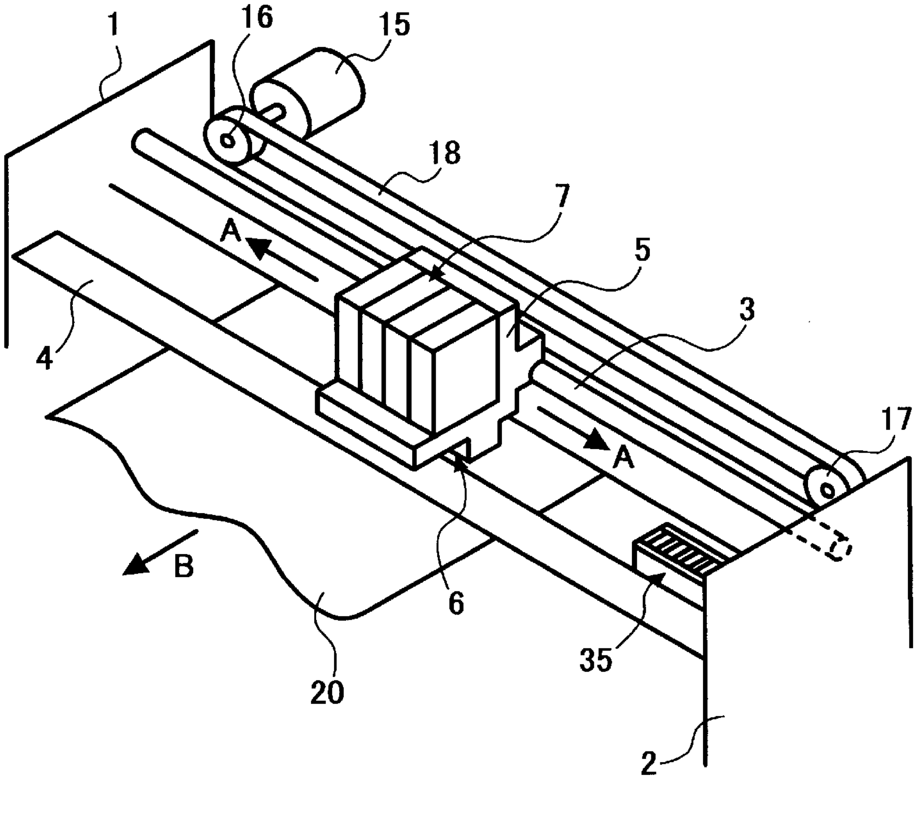
FIG. 3 is a perspective view illustrating the main part of the inkjet recording apparatus of the present invention as shown in FIG. 2.

The inkjet recording apparatus as shown in FIG. 2 has a platen roller (hereinafter referred to as a platen) 21 configured to feed a receiving paper 20 in the subscanning direction (i.e., in a direction B as illustrated in FIG. 3); feed rollers 22 and 23 which are arranged so as to contact the platen 21; a pinch roller 24 configured to feed the receiving paper 20 to a predetermined direction; a guide plate 25 facing a recording head 6; a paper discharge roller 26 which is located downstream from the recording head 6 relatively to the paper feeding direction; and a spur roller 27 which is pressed to the paper discharge roller 26.

The rotation of a sub-scanning motor 28 having a stepping motor is transmitted to the platen 21 via gears 29, 30 and 31 and a platen gear 32 to rotate the platen 21. When the platen 21 rotates, the paper 20 contained in a paper feeding section 33 is fed to the space between the recording head 6 and the guide plate 25 via the nip between the platen 21 and the feed rollers 22 and 23 and the nip between the platen 21 and the pinch roller 24. The receiving paper 20 is fed in the direction B by the discharge roller 26 and the spur roller 27, which are rotated by a gear 34 engaging the platen gear 32.

In the main recording section as shown in FIG. 3, guide rods 3 and 4, which are supported by side plates 1 and 2, support a carriage 5 such that the carriage 5 can be slid in the main scanning direction (i.e., in. a direction A). On the lower surface of the carriage 5, the recording head 6 having an inkjet head is provided such that ink drops are discharged downward. On the upper surface of the carriage 5, a cartridge 7 which supplies inks to the recording head 6 is arranged.

In the recording head 6, a head discharging a yellow ink, a head discharging a magenta ink, a head discharging a cyan ink and a head discharging a black ink are serially arranged in the main scanning direction. The carriage 5 is connected with a timing belt 18 which is supported while stretched by a driving pulley 16 and driven pulley 17 which are rotated by a main scanning motor 15 having a stepping motor. By controlling the driving of the main scanning motor 15, the carriage 5, i.e., the recording head 6, is moved in the main scanning direction.

In the inkjet recording apparatus having such a construction, color ink drops are discharged from the nozzles of each of the color ink heads of the recording head 6 while the recording head 6 (i.e., the carriage 5) is scanned in the main scanning direction and the receiving paper 20 is fed in the subscanning direction. Thus color images (including a black image) can be recorded on the receiving paper 20.

In addition, a reliability maintaining mechanism (subsystem) 35, which maintains the reliability of the recording head 6, is provided at a location on the right side of the main scanning region of the inkjet image recording apparatus. When the inkjet recording apparatus is in a print waiting state or print data are not transmitted from a host side even after a predetermined time passed, the reliability maintaining mechanism cleans the nozzle surfaces and removes dust in nozzles. Alternatively, the reliability maintaining operation may be performed at predetermined intervals. (Piezoelectric recording head)

Figure 4:
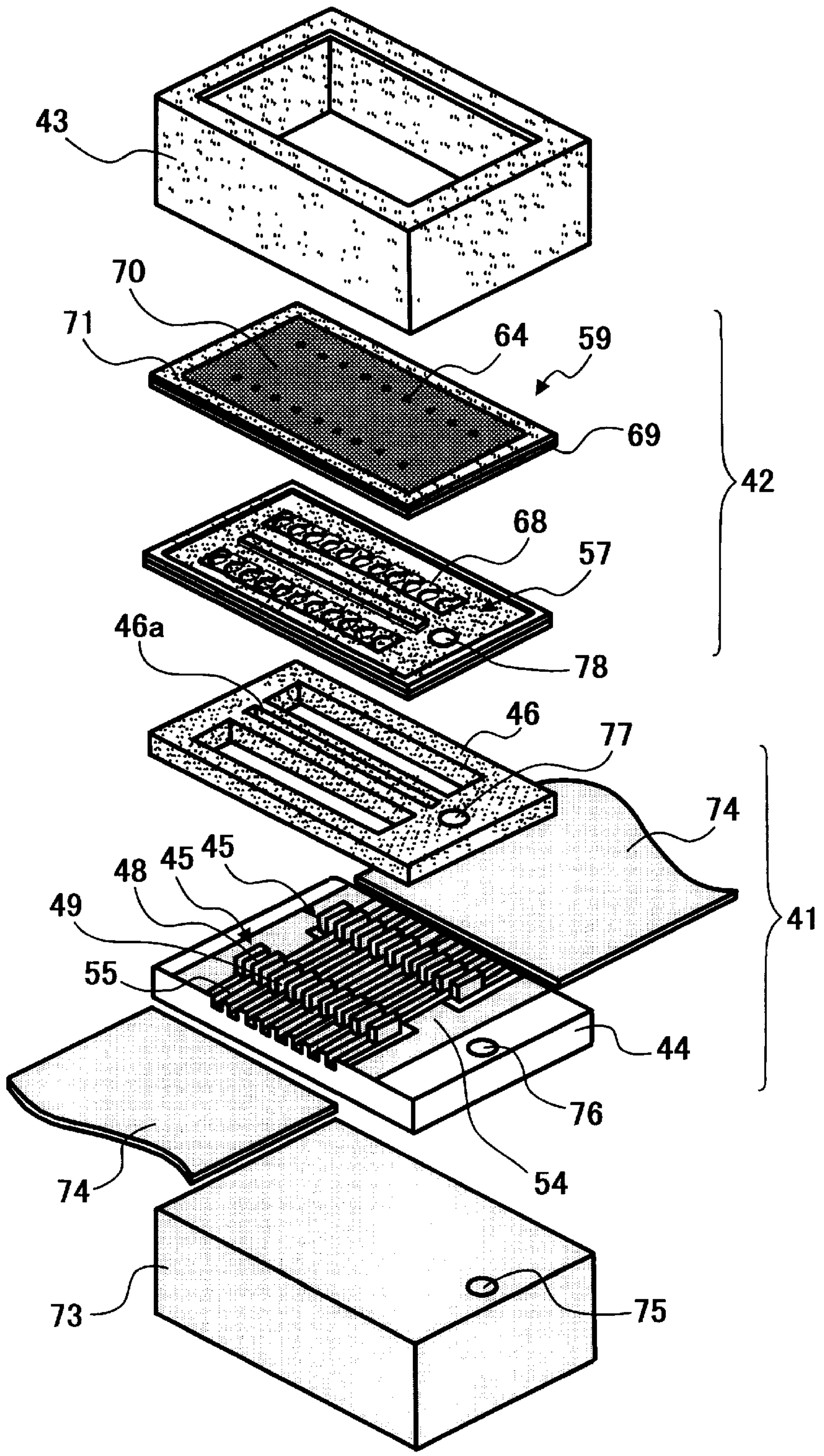
FIG. 4 is an exploded perspective view illustrating the recording head of the inkjet recording apparatus of the present invention as shown in FIG. 2.
Figure 5:
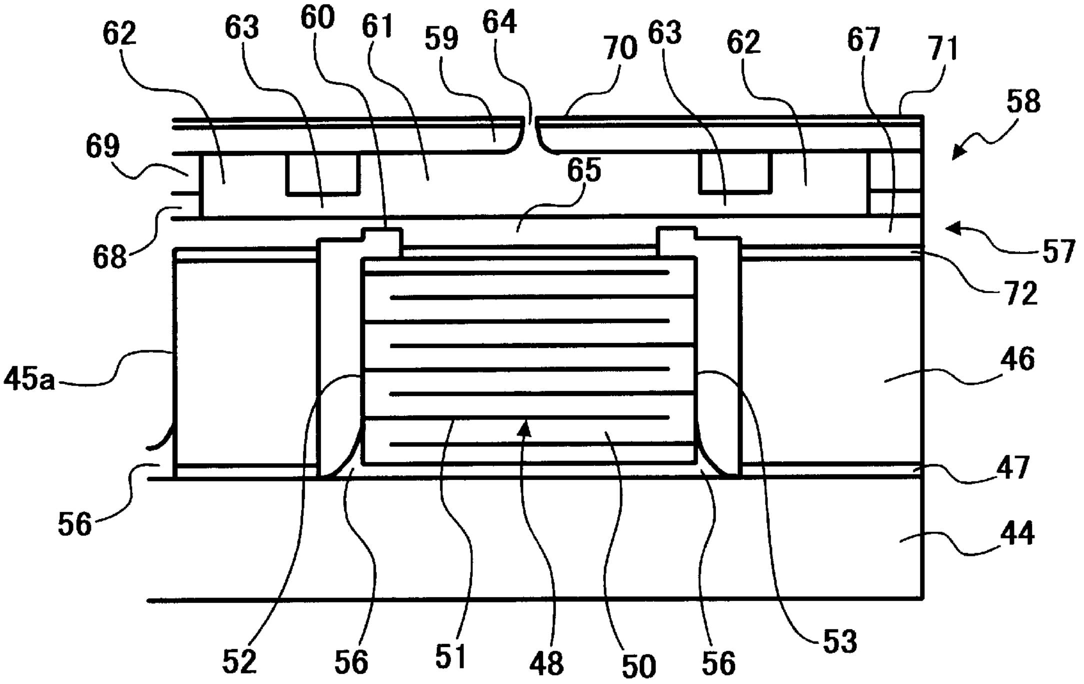
FIGS. 5 and 6 are enlarged cross sections of the recording head as shown in FIG. 4.
Figure 6:
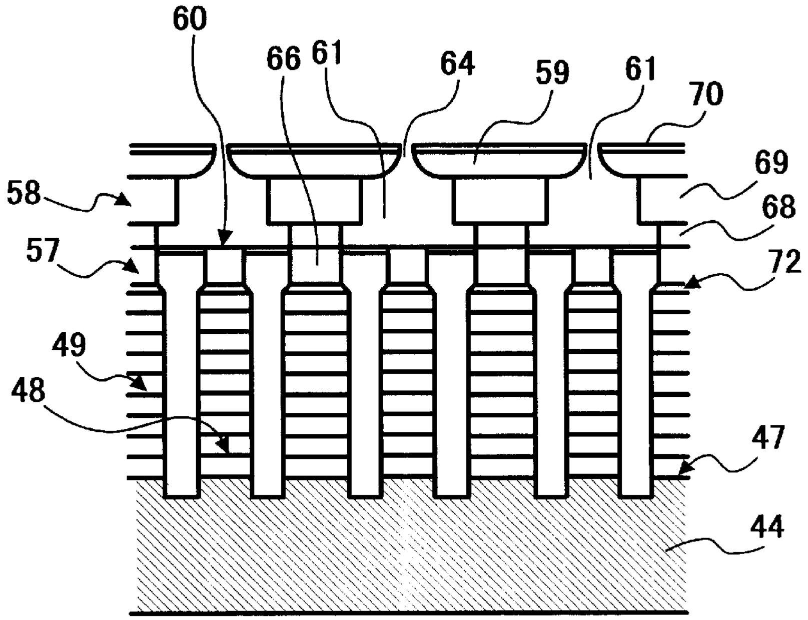

Next, a piezoelectric head will be explained as an embodiment of the recording head referring to FIGS. 4 to 6. FIG. 4 is an exploded perspective view illustrating a piezoelectric inkjet recording head. FIG. 5 is an enlarged cross section of the head illustrated in FIG. 4 when the recording head is cut along a plane in a direction perpendicular to the channel direction (i.e., the nozzle arranging direction) of the recording head.

The inkjet recording head includes a driving unit 41, a liquid room unit 42 and a head cover 43. In the driving unit 41, plural multilayer-type piezoelectric elements 45 generating energy are arranged in two lines on an insulating ceramic substrate 44 such as plates made from barium titanate, alumina, forsterite, etc., while the devices are adhered to the substrate 44. In addition, a frame 46 which is made from a resin or a ceramic and which surrounds each of the two lines of the piezoelectric elements 45 is adhered on the substrate 44 with an adhesive 47 (as shown in FIGS. 5 and 6).

In the plural piezoelectric elements 45, a piezoelectric element (sometimes referred to as a driving section) 48 to which a driving pulse is applied to discharge ink drops, and another piezoelectric element (sometimes referred to as a non-driving section) 49 which is arranged between two piezoelectric elements 48 and which serves as a liquid room supporting member fixing the liquid room unit 42 on the substrate 44, are alternatively arranged. A driving pulse is not applied to the piezoelectric elements 49.

The piezoelectric element 45 uses a multilayer-type piezoelectric element having not less than 10 layers. In the multilayer-type piezoelectric element, a lead zirconate tiatanate (PZT) layer 50 having a thickness of from 10 to 50 μm/layer and a silver/palladium (AgPd) internal electrode having a thickness on the order of a few micrometers are alternately layered, as shown in FIG. 5. However, the piezoelectric element is not limited thereto, and other electromechanical converting devices can also be used.

Every other internal electrode of the internal electrodes 51 contacts a side electrode 52 or 53. A common electrode 54 (shown in FIG. 4) and separate electrode 55 are formed in patterns on the substrate 44 by a method such as Ni/Au deposition, Au plating, AgPt paste printing and AgPd paste printing methods.

The side electrode 52, which faces the piezoelectric elements 45, is adhered on the common electrode 54 with an electroconductive adhesive 56. On the other hand, the side electrode 53, which does not face the piezoelectric elements 45, is adhered on the separate electrode 55 with an electroconductive adhesive 56. Since the piezoelectric element has such a construction, when a driving voltage (i.e., driving energy) is applied to the driving section 48, an electric field is formed in the direction toward which the layers are overlaid, and thereby the driving section 48 extends to the layered direction (i.e., a displacement in a d33 direction of the PZT crystal is caused). In the common electrode 54, as shown in FIG. 4, the electroconductive adhesive 56 is filled in a hole 46*a* which is provided in the frame 46, and therefore the patterns connected with each piezoelectric element are electrically connected.

The liquid room unit 42 has a vibrating plate 57 which has a complex structure such that thin metal layers are overlaid; an ink room separator 58 which has a two-layer structure and which is prepared by a photosensitive resin layer of dry film resist (DFR); and a nozzle plate 59 made of a metal, a resin, etc. These layers are overlaid and adhered upon application of heat. A channel is formed of one of the piezoelectric elements 45 (driving section 48); a diaphragm 60 corresponding to the one of the piezoelectric element 45; an ink pressing room 61 which is pressed via the diaphragm 60; common liquid rooms 62 and 62 which are located on the both sides of the ink pressing room 61 and which supply the ink to the ink pressing room 61; ink passages 63 and 63 which connect the ink pressing room 61 with common liquid rooms 62 and 62 and which also serve as an ink-flow resisting portion; and a nozzle 64 connected with the ink pressing room 61. Plural channels are formed in a line and two lines of the plural channels are formed.

The vibrating plate 57 is formed by a duplex nickel plating method. The vibrating plate 57 has the diaphragm 60 corresponding to the driving section 48, a projected portion 65 which is integrally formed on the diaphragm 60 and which is connected with the driving section 48, a beam 66 which is connected with the non-driving section 49, and a thick portion 67 connected with the frame 46.

The ink room separator 58 is formed, for example, by the following method. A dry film resist, which is applied on the vibrating plate 57, is exposed to light using a desired mask and then developed to form the liquid room pattern of a first photosensitive resin layer 68. On the other hand, a dry film resist, which is applied on the nozzle plate 59, is exposed to light using a desired mask and then developed to form the liquid room pattern of a second photosensitive resin layer 69. The first and second photosensitive resin layers 68 and 69 are adhered to each other upon application of heat.

A number of nozzles 64 are formed on the nozzle plate 59 to discharge ink drops. The inside of the nozzles 64 has a form such as substantial cylindrical forms, substantial frustum forms, horn forms, or the like forms. The diameter of the exit of the nozzles is from about 15 $\mu$m to about 35 $\mu$m. The surface (i.e., the surface from which ink drops are discharged) of the nozzle plate 59 is a surface 70 which is subjected to water repellent finishing, as shown in FIG. 4. Specific examples of the water repellent finishing methods include:

(1) eutectoid plating using polytetrafluoroethylene(PTFE) and nickel (Ni);
(2) electrodeposition coating using a fluorine-containing resin;
(3) vapor deposition of an evaporating fluorine-containing resin such as fluorinated pitch;
(4) methods in which a silicone resin or a fluorine-containing resin is coated using a solvent and then the resin is subjected to a heat treatment; etc.

The water repellent layer is preferably formed such that the layer is suitable for the ink used, to stabilize the form of the discharged ink drops and flying properties of the ink drops, resulting in formation of high quality images. The edge portion of the nozzle plate 59 has a non-water-repellent portion 71 which is not subjected to water repellent finishing.

The driving unit 41 and liquid room unit 42 are separately processed and assembled, and then the vibrating plate 57 of the liquid room unit 42 is adhered with the piezoelectric element 45 and the frame 46 of the driving unit 41 using an adhesive 72.

Then the substrate 44 is set on a spacer (i.e., a head holder) 73 serving as a head support. The PCB board which has a head driving IC or the like and which is set in the spacer 73 is connected with electrodes 54 and 55, which are connected with the piezoelectric elements 45 (i.e., the driving section 48), using FPC cables 74 and 74.

The nozzle cover (i.e., the head cover) 43, which has a box form, covers the edge portion of the nozzle plate 59 and the side surfaces of the head. The nozzle cover 43 has an opening which corresponds to the water-repellent surface 70 of the nozzle plate 59. The nozzle cover 43 is adhered with the non-water repellent portion 71 using an adhesive. In addition, in the inkjet head, ink supplying openings 75, 76, 77 and 78 are formed on the spacer 73, substrate 44, frame 46 and vibration plate 57, respectively, to supply the ink from an inkjet recording cartridge (not shown) to the ink room.

In this inkjet head, by applying a driving voltage (i.e., a pulse voltage of from 10 to 50 V) to the driving section 48 according to recording signals, the driving section 48 is deformed in the layered direction (i.e., the vertical direction in FIG. 5), and thereby the ink in the ink pressing room 61 is pressed by the vibrating plate 57 via the diaphragm 60, resulting in discharging of the ink-from the nozzle 64. At this point, the ink also flows from the ink pressing room 61 toward the ink passages 63 and 63 which lead to the common liquid rooms 62 and 62. However, by narrowing the cross sectional area of the ink passages 63 and 63, the ink passages 63 and. 63 can serve as a ink-flow resisting portion and the ink flow to the common liquid rooms 62 and 62 is decreased, and thereby deterioration of the ink discharge efficiency can be prevented.

When the ink drops have been discharged, the pressure of the ink pressing room 61 decreases and the ink pressing room 61 has a negative pressure (i.e., the pressing room achieves a vacuumed state) due to the inertia of the ink flow and the discharging of the driving pulse. Therefore the ink filling process is then performed. Namely, the ink supplied from the ink tank is supplied to the common liquid rooms 62 and 62. The ink is then supplied from the common liquid rooms 62 and 62 to the ink pressing room 61 via the ink passages 63 and 63. Then the vibration of the ink at the meniscus portion at the exit of the nozzle 64 attenuates and the ink is returned to the vicinity of the exit of the nozzle 64 due to the surface tension of the ink. Thus, the ink is stabilized, i.e., the ink achieves a refilled state. Then the next ink drop discharging operation is performed.

Figure 7:
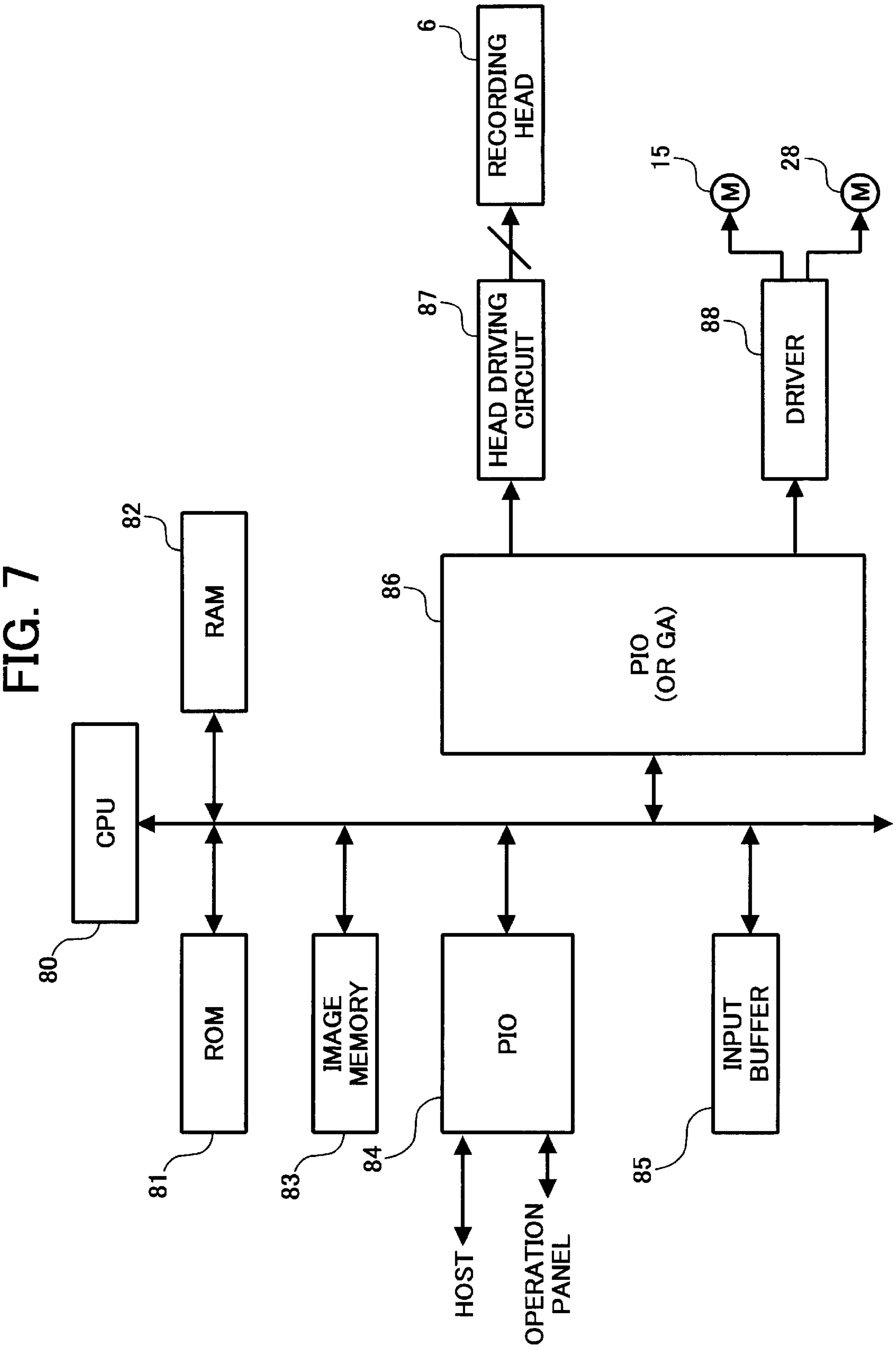
FIG. 7 is a block diagram of an embodiment of the controller of the inkjet recording apparatus of the present invention.

Next, the controller of the inkjet recording apparatus of the present invention will be explained referring to FIG. 7. The controller has a microcomputer (hereinafter sometimes referred to as a CPU) 80 which controls the entire recording apparatus, a ROM 81 which stores necessary fixed information, a RAM 82 which is used as a working memory, an image memory 83 which stores data obtained by processing the image information, a parallel input/output (PIO) port 84, an input buffer 85, a gate array (GA) or a parallel input/output port 86, a head driving circuit 87, a driver 88, etc.

The following information is input to the PIO port 84.

(1) image information sent by a host computer;
(2) information concerning the species of the recording paper used;
(3) information concerning the instruction directed by an operation panel (not shown);
(4) detection signals of the tip edge and rear edge of a recording paper detected by a paper sensor;
(5) detected signals that the carriage 5 is in a home position (i.e., a standard position), which is detected by a home position sensor; etc.

In addition, various information is also sent to the host or the panel via the PIO port 84.

The head driving circuit 87 applies a predetermined driving voltage to the energy generation elements to discharge ink drops from the nozzles of the recording head 6 corresponding to the energy generation elements (i.e., the piezoelectric elements) according to image information. In addition, the head driving circuit 87 also applies a predetermined driving voltage to the energy generation elements to vibrate the ink in non-discharge nozzles.

In addition, the driver 88 controls driving of the main scanning motor 15 and a subscanning motor 28 according to the driving data which are sent from the PIO port 88 such that the carriage 5 is moved toward the main scanning direction and the platen 21 is rotated to feed the paper 20 by a predetermined driving distance.

Figure 8:
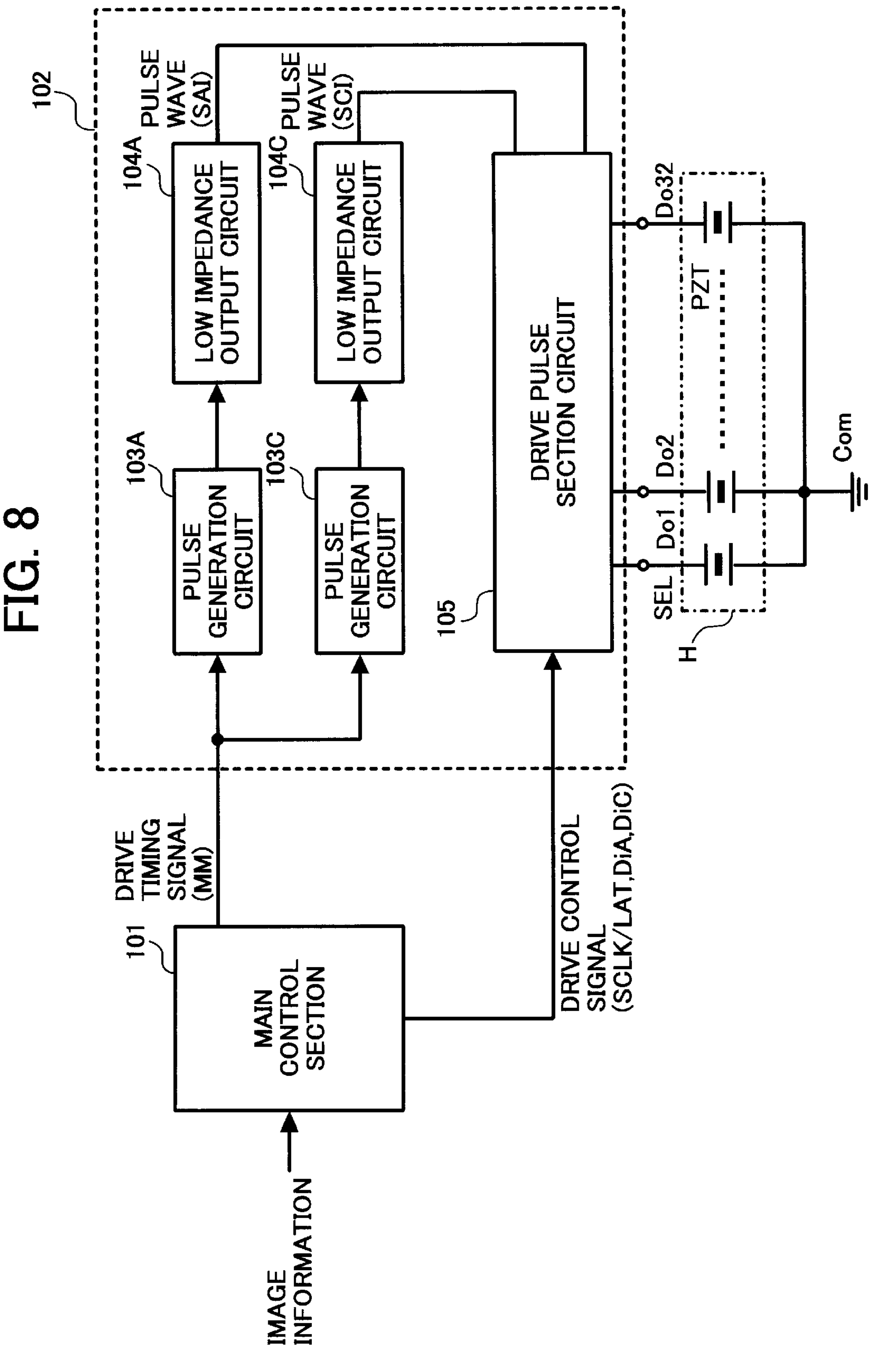
FIG. 8 is a block diagram of an embodiment of the recording head driver of the controller of the inkjet recording apparatus of the present invention.

Next, an embodiment of the drive control of the recording head in the controller will be explained referring to FIG. 8. FIG. 8 illustrates a portion concerning one of the recording heads. In FIG. 8, an inkjet head H constituting the recording head 6 has plural (in this embodiment the number is 32)

energy generation elements (i.e., piezoelectric elements PZT) corresponding to the plural (i.e., 32) nozzles 64. One of the electrodes of each PZT is a common electrode (Com) (i.e., the common electrode 54 mentioned above), and the other electrode of each PZT serves as a selection electrode (SEL) (i.e., the separate electrode 55). In reality, the nozzles 64 are formed in two lines as mentioned above, and therefore the inkjet head H has 64 nozzles in this embodiment.

The head drive controller, which controls driving of the head, has a main control section 101 which includes the above-mentioned CPU 80, ROM 81, Ram 82 and peripheral circuits; and a head driving section 102 for driving the inkjet head H. At this point, the head driving section 102 is provided for each color ink, and therefore four head driving sections 102 are provided in the head driving circuit 87.

The main controlling section 101, to which image information is input by a host such as personal computers, outputs the following drive control signals to the head driving section 102:

(1) a drive timing signal (MM) for specifying the time at which driving pulse is generated;

(2) serial data (i.e., nozzle data) DiA and DiC for specifying the nozzles from which ink drops are to be discharged in each pulse voltage application; and (3) a timing signal (shift clock SCLk and latch signal LAT).

The head driving section 102, to which the drive timing signal MM is input by the main control section 101, has a pulse generation circuit 103A which outputs a driving pulse SAi to apply driving energy to a piezoelectric element PZT such that ink drops are discharged from the corresponding nozzle, a pulse generation circuit 103C which outputs a pulse wave SCi to apply driving energy to a piezoelectric element PZT to an extent that ink drops are not discharged from the corresponding nozzle, low impedance output circuits 104A and 104C which output the outputs (i.e., SAi and SCi) from the pulse generation circuit 103A and 103C, and a drive pulse selection circuit 105 which outputs either the driving pulse (SAi) or driving pulse (SCi) to each of the selection electrodes Do1 to Do32.

The pulse generation circuits 103A and 103C are constituted of, for example, acombination of a pulse generation circuit such as ROMs, D/A converters and other pulse generation circuits with a pulse wave changing circuit such as differential/integration circuits, clip circuits and cramp circuits. In addition, the following signals are also input to the pulse generation circuits 103A and 103C as well as the above-mentioned drive timing signal (MM) input by the main controlling section 101:

(1) Vp control signal (SVp) for selecting the voltage (Vp) of the driving pulse; and/or (2) tr control signal (Str) for selecting rising time constant (tr) of the driving pulse, which is mentioned below.

The action of the inkjet recording apparatus of the present invention will be explained referring to FIG. 9. The main control section 101 outputs the following data to the drive pulse selection circuit 105 of the head driving section 102 as drive control signals:

(1) discharge nozzle data (DiA) which are 32 bit serial data and which specify the discharge nozzles from which ink drops are to be discharged;

(2) discharge nozzle data (DiC) which are 32 bit serial data and which specify the non-discharge-nozzles from which no ink drops are to be discharged but which are vibrated; and (3) timing signals, i.e., a sift clock SCLK and a latch signal LAT.

Thus, any one of a zero voltage, VpC and VpA (VpA>VpC) is applied to each piezoelectric element PZT as the driving voltage Vp. Namely, a pulse having a voltage VpA and a pulse wave SAi is applied to a nozzle from which an ink drop is to be discharged (this nozzle is hereinafter referred to as a discharge driving nozzle). A pulse having a voltage VpC and a pulse wave SCi is applied to a nozzle, from which no ink drop is to be discharged but which is to be vibrated to vibrate the ink at the meniscus portion in the nozzle (this nozzle is hereinafter referred to as a non-discharge driving nozzle). SAi or SCi is not applied (i.e., a zero voltage is applied) to a nozzle from which no ink drop is to be discharged and which need not to be vibrated (this nozzle is hereinafter referred to as a non-driving nozzle).

Figure 9:
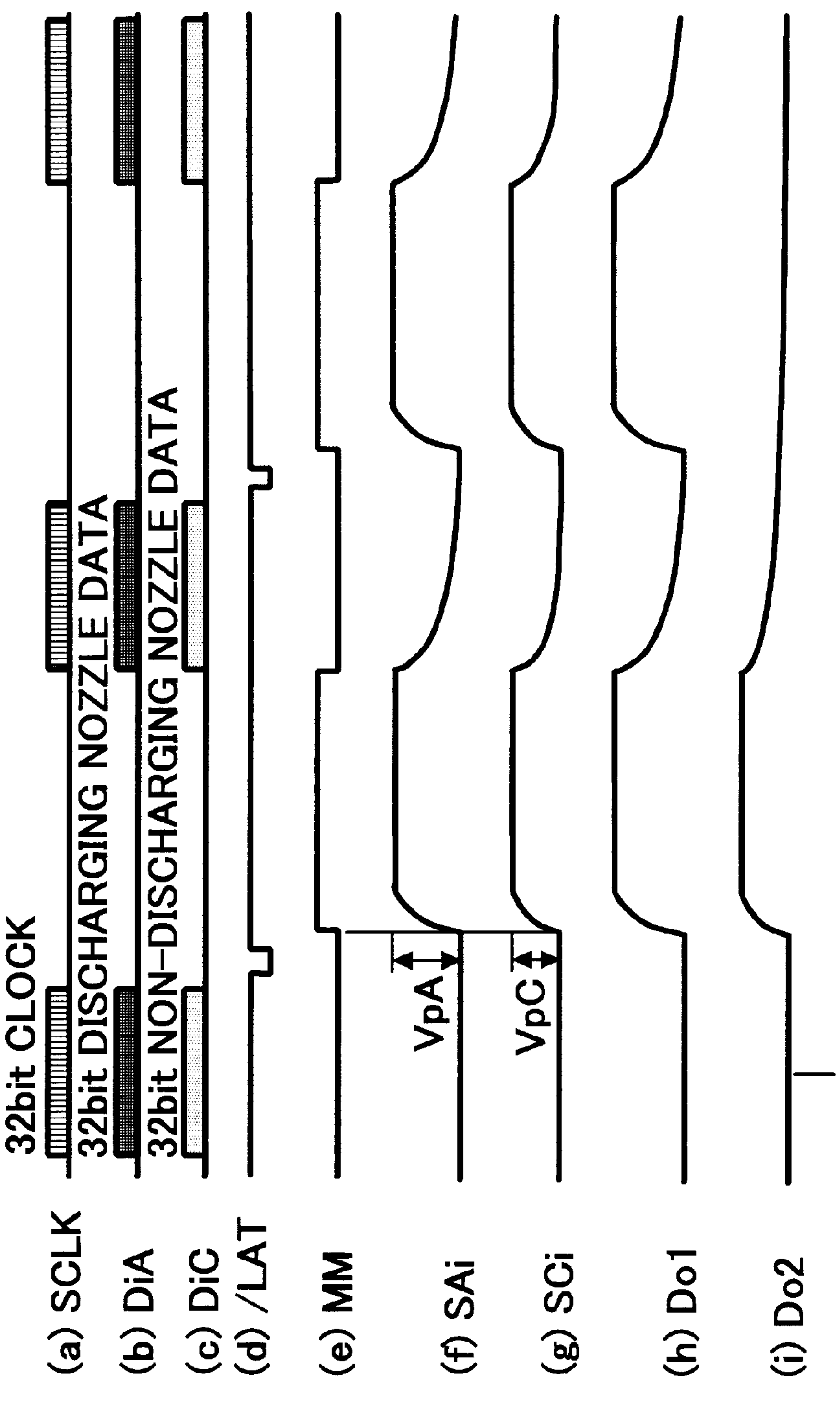
FIG. 9 is a block diagram illustrating an embodiment of pulse generating circuit as illustrated in FIG. 8.

FIG. 9 illustrates an embodiment of non-discharge driving in which the amplitude of the pulse applied for the non-discharge nozzle is different from that of the discharging nozzle. However, the non-discharge driving method is not limited thereto. For example, a non-discharge driving method in which the pulse width of the pulse applied for the non-discharge driving nozzle is different from that of the discharging nozzle can also be preferably used. In addition, by prolonging the voltage falling time of the non-discharging pulse relative to that of the discharging pulse, the ink at the meniscus portion can be stably vibrated.

Electrostatic Head

As a recording head utilizing mechanical energy for use in the inkjet recording apparatus of the present invention, devices in which a vibrating plate is deformed utilizing an electrostatic force can be preferably used.

Figure 10:
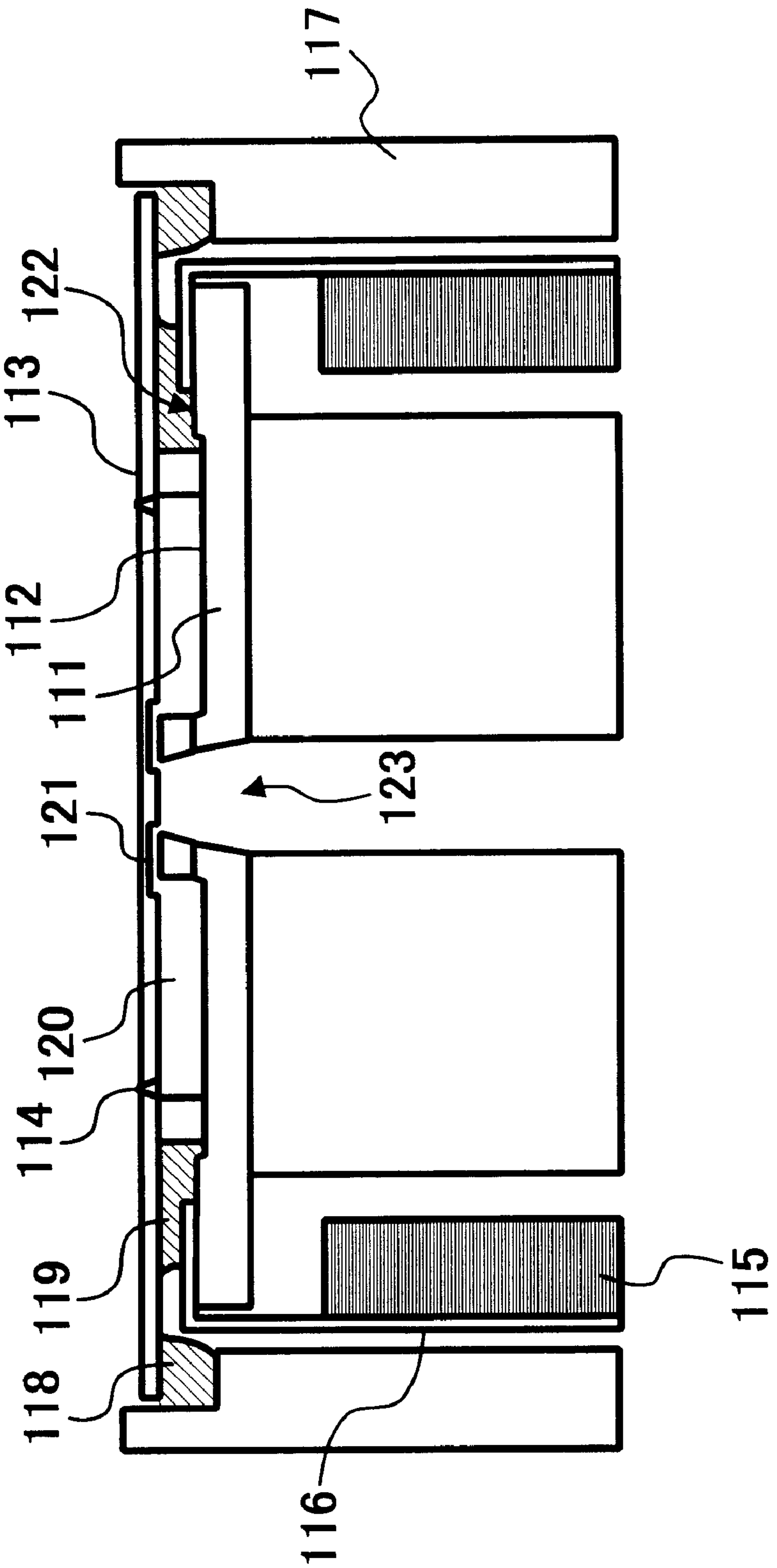
FIG. 10 is a schematic view illustrating the cross section of an electrostatic recording head for use in the inkjet recording apparatus of the present invention.

FIG. 10 illustrates a cross section of an embodiment of the electrostatic recording head for use in the inkjet recording apparatus of the present invention.

The electrostatic recording head includes an electrostatic actuator 111 having plural vibrating plates 112, a nozzle plate 113 having plural nozzles 114, a driver IC 115 which applies a voltage to the electrostatic actuator 111, a FPC cable 116 connecting the driver IC 115 with the electrostatic actuator 111, a frame 117 supporting the electrostatic recording head, a filter configured to prevent the recording head from dust, and joints which supply the ink and power from the main body to the recording head. Numerals 118 and 119 denote a nozzle plate sealing agent and a vibrating plate gap sealing agent, respectively. Numerals 120, 121 and 122 denote an ink pressing room, a fluid resistance portion and an electrode, respectively. Numeral 123 denotes a common ink passage.

Figure 11:
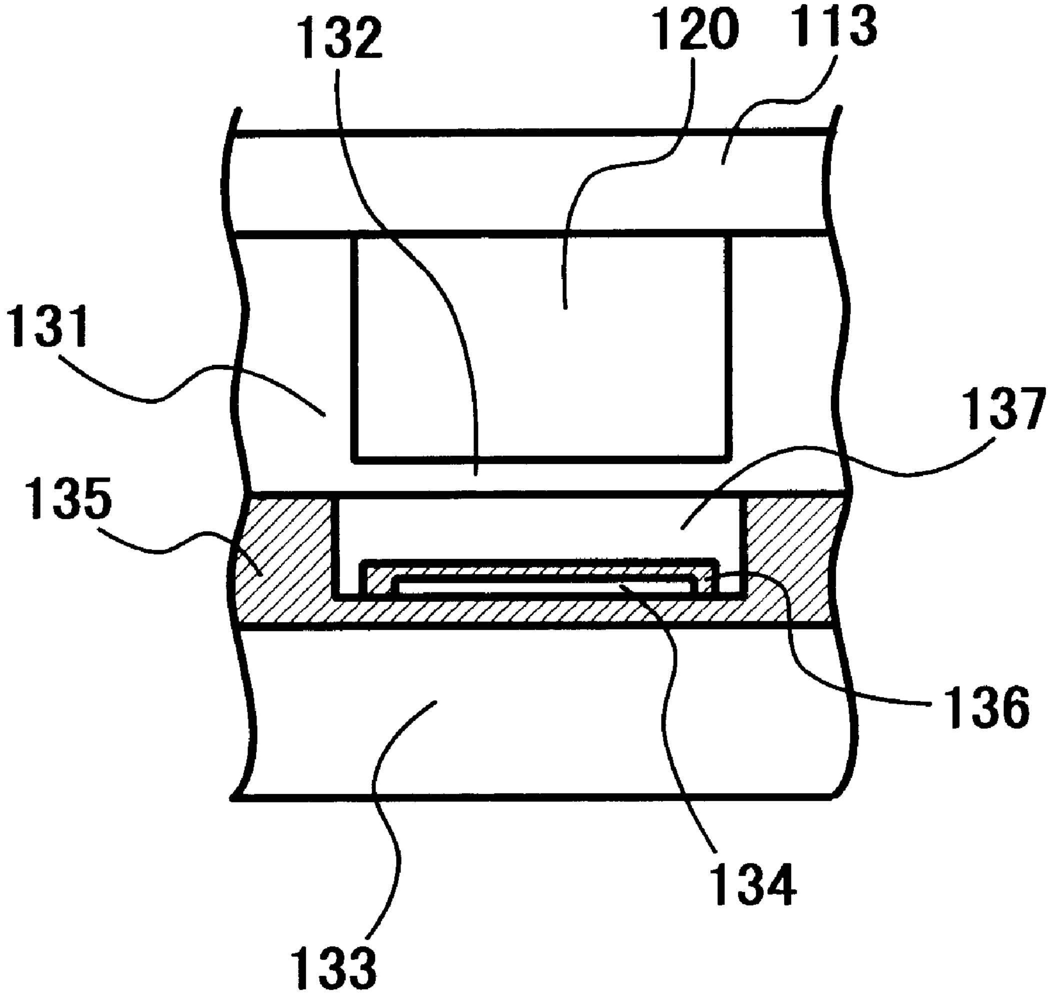
FIG. 11 is an enlarged cross section of the main part of the electrostatic recording head as shown in FIG. 10.

FIG. 11 is an enlarged view of the ink pressing room 120 of the electrostatic recording head. The electrostatic actuator 111 includes a vibrating plate substrate 131 which forms a vibrating plate 132, and a separate electrode substrate 133 in which a separate electrode 134 is arranged so as to face the vibrating plate 132 and which is connected with the vibrating plate substrate 131.

The vibrating plate substrate 131 is made from a p-form silicon in which boron is doped, and is formed by anisotropically etching a single crystal. In particular, it is preferable to dope boron in the vibrating plate at a high concentration because the etching rate can be decreased and the thickness of the vibrating plate can be precisely controlled.

In addition a common electrode (not shown) is formed on the vibrating plate substrate 131. The common electrode can be formed, for example, by sputtering a metal such as aluminum and then sintering (i.e., heat diffusing) the metal. Thus, conduction with the vibrating plate substrate can be secured. This electrode is formed to obtain ohmic contact with the substrate made of a semiconductor material.

The separate electrode substrate 133 is also made from a p-form silicon which is the same kind as that of the vibrating plate substrate 131. On the surface of the silicon substrate, an oxide layer (an insulating layer) 135 is formed and then etched by isotropic etching. The depth of the etched portion is controlled such that when the separate electrode substrate 133 is adhered with the vibrating plate 131, a gap 137 is formed therebetween.

A TiN layer is formed on the etched portion of the oxide layer 135 and then patterned to form the separate electrodes 134. Although not shown in FIG. 11, there are plural electrodes corresponding to the channels are arranged. The material of the separate electrodes 134 is not limited thereto, and any materials which can endure the high temperature at which the electrode is adhered can be used therefor. A protective layer 136, which is insulative, is formed on the separate electrodes 134. In this embodiment, a $SiO_2$ layer is formed and then patterned to form the protective layer 136.

The vibrating plate substrate 131 and the separate electrode substrate 133 are adhered to each other by a bonding method such as direct bonding and eutectic bonding. In the direct bonding method, the substrates are typically bonded at a high temperature of about 1000° C. In this case, a pure substrate can be formed. In the eutectic bonding, they are bonded with a binder such as gold therebetween.

The gap 137 formed between the vibrating plate and the separate electrode after the bonding operation is 0.2 μm in the present embodiment of the inkjet recording apparatus of the present invention.

As shown in FIG. 10, the common ink passage 123 is formed in the electrostatic actuator 111. The common ink passage 123 passes through the separate electrode substrate 133 and the vibrating plate substrate 131. An ink is supplied from the backside of the separate electrode substrate 133 to the common ink passage 123.

The nozzle plate 113 has the plural nozzles 114 facing the vibrating plates 112, and a recessed portion forming the ink-flow resisting portion 121. In the present embodiment, the nozzle plate 113 is formed by a nickel electroforming method.

The bonding of the electrostatic actuator 111 with the nozzle plate 113 and the frame 117 is performed using an adhesive. In this case, the vibrating plate gap is hermetically sealed with the vibrating plate sealing agent 119. In this embodiment, an epoxy resin is used as the vibrating plate sealing agent 119.

The gap between the nozzle plate 113 and the frame 117 is also sealed with the nozzle plate sealing agent 118 to prevent the ink from contacting the electric circuits such as the separate electrodes and the FPC cable 116. The electrostatic actuator 111 is electrically contacted with the FPC cable 116 using an anisotropic electroconductive film.

When a pulse voltage is applied to the separate electrode, a potential is induced between the vibrating plate, which is the common electrode of the plural electrostatic actuators, and the separate electrode, and thereby an electrostatic force is induced between the separate electrode and the vibrating plate. Thereby, the vibrating plate is deformed in proportion to the applied voltage. At this point, the vibrating plate may contact the electrode (i.e., a contact method) or may not contact the electrode (i.e., a non-contact method).

When the application of the pulse voltage is stopped, the vibrating plate 112 is revived and the pressure in the ink pressing room 120 is increased by the restoring force of the vibrating plate 112.

When the pulse voltage is applied and the vibrating plate is attracted by the separate electrode, the pressure in the ink pressing room 120 is decreased. Since the pressure vibrates at a frequency specific to the ink pressing room 120, the pressure in the ink pressing room 120 when the application of the pulse voltage is stopped is a combination of the residual vibration pressure with the restoring pressure. Namely, the ink discharging performance changes depending on the pulse width of the applied pulse voltage.

Figure 12:
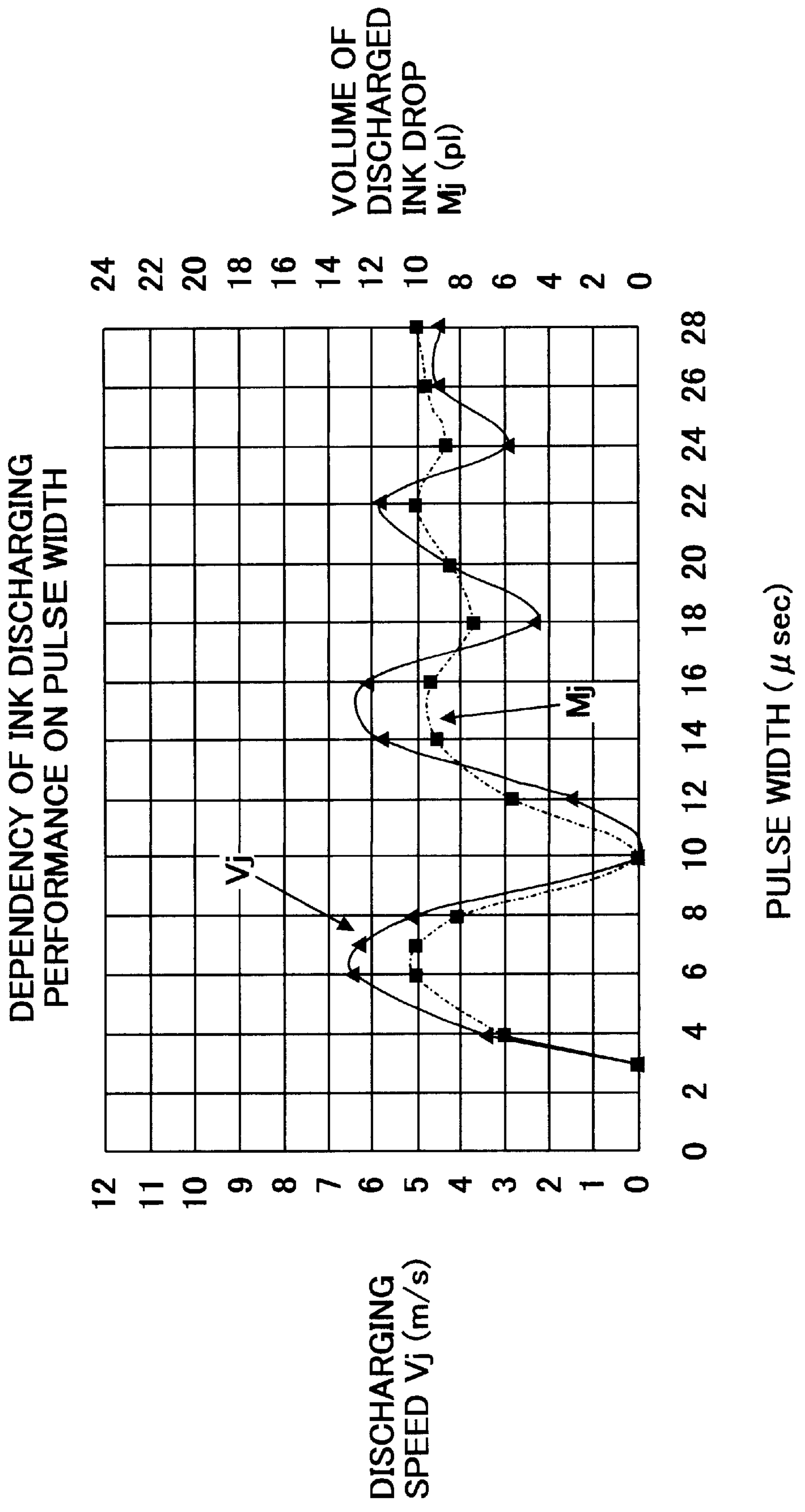
FIG. 12 is a graph illustrating ink discharging properties of the electrostatic recording head as shown in FIG. 10.

FIG. 12 is a graph illustrating the dependency of ink discharging performance (i.e., discharging speed (Vj) and volume (Mj) of discharged ink drop) on the pulse width of the applied pulse voltage.

In this case, when the pulse width is set so as to be less than 4 μs or a pulse width (i.e., about 10 μs) between the first peak pulse width and the second peak pulse width, ink drops are not discharged. Namely, when the pulse width is so short that the application of the pulse voltage is stopped before the vibrating plate deforms by one third of the gap length or when the pulse voltage having a pulse width at which the pressure vibration is cancelled is applied, ink drops are not discharged but the meniscus portion of the ink in the nozzle is vibrated because restoring force is not so strong.

Alternatively, vibration of the ink at the meniscus potion can be performed by gradually restoring the vibrating plate by fully prolonging the pulse falling time. By using these properties, the clogging problem due to increase of the ink viscosity can be prevented.

Whether or not a non-discharging pulse voltage is applied to a nozzle such that no ink drop is to be discharged but the ink at the meniscus portion is vibrated can be freely determined depending on the ink properties, environmental conditions and image information tobe printed. For example, when the ink used has a property such that the pigment content of the ink at the meniscus portion hardly decreases if the ink is not discharged for 5 seconds and the pigment content seriously decreases if the ink is not discharged for 10 seconds, the non-discharging pulse voltage application operation is not performed for the nozzle from which an ink drop has not been discharged for 5 seconds and is performed for the nozzle from which an ink drop has not been discharged for 10 seconds. By performing such operation, unnecessary driving can be avoided, and thereby deterioration of the recording head can be avoided.

Figure 13:
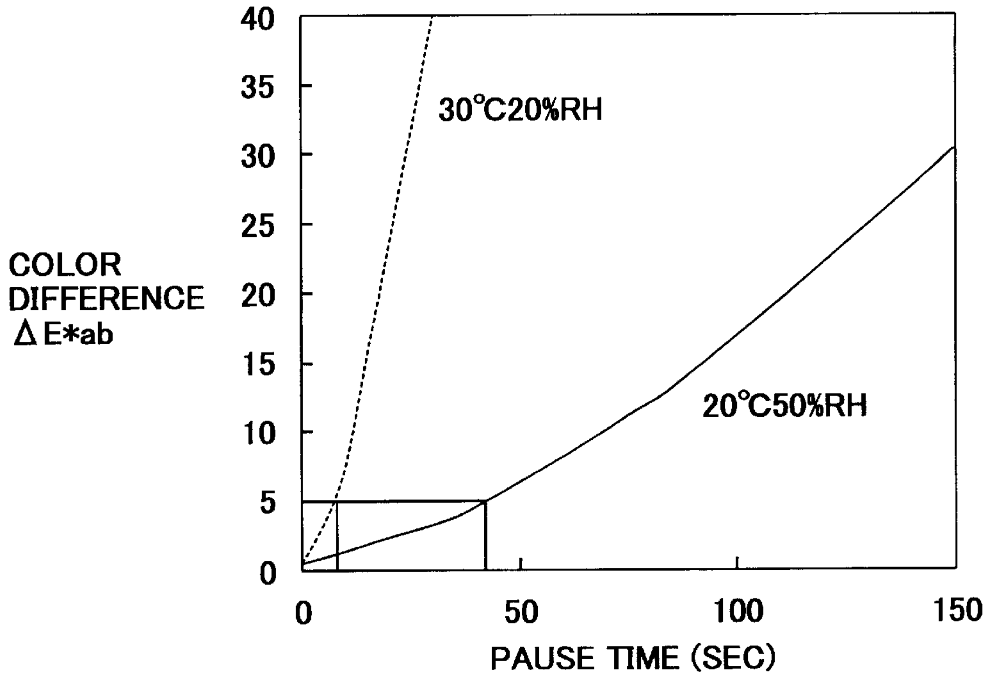
FIG. 13 is a graph for explaining how to determine whether or not the non-discharge driving is performed.

It is preferable to determine whether or not the non-discharging driving operation is performed on a nozzle while considering the ink properties. For example, the relationship between color tone of the printed images and relative humidity and/or pause time is preferably considered. FIG. 13 is a graph illustrating the relationship between color tone (color difference) of printed images and a pause time during which ink drops are not discharged. This relationship is preliminarily obtained for an ink while environmental condition (for example, the relative humidity) is changed. For example, when the color difference of the printed images is permitted if the color difference is not greater than 5, the information concerning the printing conditions under which the color difference of printed images exceeds 5 is stored in a ROM. Whether or not the non-discharge drive is performed is determined according the information stored in the ROM, i.e., the relative humidity detected by a humidity sensor and pause time which can be determined by the image information to be printed.

The color difference in FIG. 13 is obtained based on the CIE 1976 Lab* color system. As the light source, any one of the light sources described in the color system can be used. By using such a printing method, the color difference of the printed images can be controlled so as to be not greater than 5, and thereby the resultant print images have an improved sharpness. The image quality by which printed images are evaluated is not limited to the color difference and may be the image density, grades of images which are determined by visual observation, or the like quality.

The non-discharge driving for a nozzle is preferably performed just before an ink discharging operation for the nozzle. However, if desired, a non-discharge driving may be additionally performed at the middle of the print suspension time.

The number of pulses applied to a nozzle just before an ink discharging operation is preferably from 10 to 5000, depending on the relative humidity of the environment and the image data to be printed. When the pulse number is less than 10, the pigment content at the meniscus portion cannot fully recovered. In contrast, when the pulse number is greater than 5000, the life of the recording head tends to be shortened.

In the inkjet recording method of the present invention, an idle discharging operation in which ink drops are discharged (i.e., ink drops are disposed of) at a non-printing area and which is performed at regular intervals and/or at a time a predetermined time after the previous discharge operation is preferably performed at an interval not shorter than 60 seconds to prevent the clogging problem and to impart good periodic discharge stability to the inkjet recording apparatus. When the interval is not shorter than 60 seconds, the idle discharging operation need not to be performed in the middle of printing images on a paper sheet, and therefore high speed printing can be performed.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Preparation of Pigment Dispersion 1

The following components were mixed and subjected to a dispersion treatment using a sand mill to prepare a cyan pigment dispersion 1 was prepared.

| | |
|---|---|
| C.I. pigment blue 15:3 | 20% |
| Diethanolamine salt of styrene-acrylate-methacrylic acid copolymer | 4.5% |
| Ethylene glycol | 10% |
| Deionized water | 65.5% |

Preparation of Ink

The following components were mixed while stirring and then subjected to a filtering treatment using a membrane filter having openings having an average diameter of 0.8 μm.

| | |
|---|---|
| Cyan pigment dispersion 1 prepared above | 15% |
| Glycerin | 10% |
| Diethyleneglycol monobutyl ether | 5% |
| An adduct of acetylene glycol with ethylene oxide (SURFINOL 465 from Nisshin Chemical Industry Co., Ltd.) | 1.0% |
| Deionized water | 69% |

Thus, an ink of Example 1 was prepared. The average particle diameter of the pigment in the ink was 90 nm which was measured using an instrument, MICROTRAC UPA150 manufactured by Leeds & Northrup.

In addition, the zeta potential (z1) of the ink was measured using an instrument, ESA-9800 manufactured by Matec Applied Sciences. Further, the zeta potential (Z2) of the condensed ink which was prepared by condensing the ink at 30° C. 20% RH such that the pigment content of the condensed ink is from 1.25 to 1.50 times that of the original ink was also measured. The zeta potential Z1 and the difference (|Z1|−|Z2|) are shown in Tables 1-1 and 2-3.

Comparative Example 1

Preparation of Pigment Dispersion 2

The procedure for preparation of the pigment dispersion in Example 1 was repeated except that the formulation of the pigment dispersion was changed as follows.

| | |
|---|---|
| C.I. pigment red 122 | 20% |
| Styrene-acrylate-methacrylic acid copolymer | 4.5% |
| Ethylene glycol | 10% |
| Deionized water | 65.5% |

Preparation of Ink

The procedure for preparation of the ink in Example 1 was repeated except that the formulation of the ink was changed as follows.

| | |
|---|---|
| Pigment dispersion 2 | 20% |
| Ethylene glycol | 10% |
| An adduct of acetylene glycol with ethylene oxide (SURFINOL 465 from Nisshin Chemical Industry Co., Ltd.) | 1.0% |
| Deionized water | 69% |

Thus, an ink of Comparative Example 1 was prepared. The average particle diameter of the pigment in the ink was 120 nm.

Comparative Example 2

Preparation of Pigment Dispersion 3

The procedure for preparation of the pigment dispersion in Example 1 was repeated except that the formulation of the pigment dispersion was changed as follows.

| | |
|---|---|
| C.I. pigment yellow 74 | 20% |
| Sodium laurylsulfate | 3.5% |
| Ethylene glycol | 5% |
| Deionized water | 71.5% |

Preparation of Ink

The procedure for preparation of the ink in Example 1 was repeated except that the formulation of the ink was changed as follows.

| | |
|---|---|
| Pigment dispersion 3 | 20% |
| Triethylene glycol | 15% |
| Sodium benzoate | 0.5% |
| Deionized water | 64.5% |

Thus, an ink of Comparative Example 2 was prepared. The average particle diameter of the pigment in the ink was 119 nm.

Comparative Example 3

Preparation of Ink

The procedure for preparation of the ink in Example 1 was repeated except that the pigment dispersion 1 was not prepared and the formulation of the ink was changed as follows.

| | |
|---|---|
| Aqueous dispersion of carbon black which had been subjected with an ozonization treatment (pigment concentration of 20%) | 25% |
| 1,5-pentanediol | 10% |
| Sodium dialkylsulfosuccinate | 0.5% |
| Deionized water | 64.5% |

Thus, an ink of Comparative Example 3 was prepared. The average particle diameter of the pigment in the ink was 134 nm.

Example 2

Preparation of Ink

The procedure for preparation of the ink in Example 1 was repeated except that the pigment dispersion 1 was not prepared and the formulation of the ink was changed as follows.

| | |
|---|---|
| Aqueous dispersion of carbon black with which a carboxyl group had been combined (pigment concentration of 15%) | 33.3% |
| Glycerin | 5% |
| Triethylene glycol | 10% |
| N-methyl-2-pyrrolidone | 1.0% |
| Compound having formula (1)-2 | 0.5% |
| Deionized water | 50.2% |

Thus, an ink of Example 2 was prepared. The average particle diameter of the pigment in the ink was 128 nm.

Example 3

Preparation of Pigment Dispersion 4

The procedure for preparation of the pigment dispersion in Example 1 was repeated except that the formulation of the pigment dispersion was changed as follows.

| | |
|---|---|
| C.I. pigment red 122 | 25% |
| Ammonium salt of sulfate ester of an adduct of nonylpropenylphenol with 20 moles of ethylene oxide | 5% |
| Pure water | 70% |

Preparation of Ink

The procedure for preparation of the ink in Example 1 was repeated except that the formulation of the ink was changed as follows.

| | |
|---|---|
| Pigment dispersion 4 | 14% |
| Ethylene glycol | 5% |
| Diethylene glycol | 10% |
| Lithium salt of the surfactant having formula (1)-2 | 1.0% |
| Deionized water | 70% |

Thus, an ink of Example 3 was prepared. The average particle diameter of the pigment in the ink was 117 nm.

Example 4

Preparation of Pigment Dispersion 5

The procedure for preparation of the pigment dispersion in Example 1 was repeated except that the formulation of the pigment dispersion was changed as follows.

| | |
|---|---|
| C.I. pigment yellow 74 | 20% |
| Ammonium salt of sulfate ester of an adduct of nonylpropenylphenol with 20 moles of ethylene oxide | 3% |
| An adduct of octylpropenylphenol with 50 moles of ethylene oxide | 2% |
| Pure water | 75% |

Preparation of Ink

The procedure for preparation of the ink in Example 1 was repeated except that the formulation of the ink was changed as follows.

| | |
|---|---|
| Pigment dispersion 5 | 10% |
| Glycerin | 5% |
| Diethylene glycol monobutyl ether | 10% |
| Ammonium salt of the surfactant having formula (1)-1 | 0.5% |
| Deionized water | 74.5% |

Thus, an ink of Example 4 was prepared. The average particle diameter of the pigment in the ink was 98 nm.

Evaluation Method

I. Periodic Discharge Stability Test 1 (Using a Piezoelectric Recording Head Having Nozzles Having a Diameter of 30 μm)

Images were formed using each of the inks prepared in Examples 1 to 4 and Comparative Examples 1 to 3 and the inkjet recording apparatus having a constitution as illustrated in FIGS. 2 to 8. The recording conditions are as follows:

1) Recording head used: a piezoelectric head having a construction as shown in FIG. 5 and nozzles having a diameter of 30 μm.
2) Driving frequency: 12 kHz
3) Ratio (E/W) of applied power (E) to total weight (W) of discharged ink drops when an ink which does not include a pigment and which has a viscosity of 3 mPa·s and a surface tension of 30 mN/m: $1\times10^{-7}$ J/pg
4) Non-discharge driving condition A pulse voltage which is about one half of that of the driving pulse applied for discharging ink was applied (hereinafter referred to as "½ pulse amplitude mode") or a pulse voltage having a pulse width which is one third of that of driving pulse applied for discharging ink was applied (hereinafter referred to as "⅓ pulse width mode").

A periodic discharge test was performed under an environmental condition of 30° C. 20% RH. The procedure is as follows:

(1) an ink set in the printer;
(2) the carriage was scanned one time without ink discharging (i.e., an idle-scanning operation was performed);.
(3) 20 ink drops were discharged from each nozzle on a gloss inkjet recording film;
(4) a revival operation (i.e., an idle-discharging operation in which 50 ink drops were disposed of) was performed; and
(5) Then the operations (2) to (5) were repeated 5 times.

The idle-scanning operation was performed for a time of 5, 10, 30, 60 or 90 seconds. The resultant images were visually compared with continuously printed images. In addition, a non-discharge driving operation was performed just before the printing operation (3) mentioned above.

The dot images of the 20-drop dot images, particularly the first dot image, were visually evaluated with respect to the color tone, image density and position of the dot (i.e., ink drop discharging direction) while the images were enlarged using a magnifying glass.

The quality of the first dot image was graded as follows:

⊚: The image density and color tone of the first dot image are the same (i.e., Munsell AA class) as those of the continuously printed images, and the outline of the first dot image is clear.

○: The image density and color tone of the first dot image are slightly changed compared to those of the continuously printed images (i.e., Munsell A class) and the outline of the first dot image is clear.

Δ: The first dot image has the paling problem, and the outline of the first dot image is unclear.

ΔΔ: The image density of the first dot image is higher than that of the continuously printed images, and the diameter of the first dot image is smaller than that of the continuously printed images.

X: The first dot image is invisible due to the paling problem.

XX: Dot images cannot be formed.

The ink drop discharging direction was evaluated as follows:

○: The first dot image is formed while arranged in substantially a line (i.e., there is no variation with respect to the ink drop discharging direction).

Δ: The ink drop discharging direction for the first dot image is slightly varied but the first dot image does not overlap with the second dot images.

X: The first dot image overlaps with the second dot image or is formed at a position exceeding the second dot image position.

The results are shown in Tables 1-1 to 1-3.

II. Periodic Discharge Stability Test 2 (Using an Electrostatic Recording Head Having Nozzles Having a Diameter of 20 μm)

Images were formed using each of the inks prepared in Examples 1 to 4 and Comparative Examples 1 to 3 and the inkjet recording apparatus which was used in the periodic discharge stability test 1 and which was modified so as to have a recording head having a construction as shown in FIGS. 10 and 11. The recording conditions are as follows:

1) Recording head used:

nozzle diameter: about 20 μm width of ink pressing room: 1000 μm thickness of the vibrating plate: 2 μm 2) driving frequency: 12 kHz 3) pulse width of pulse for non-discharge driving: 2 μs 4) voltage of pulse for non-discharge driving: 30 V 5) pulse width of pulse for discharge driving: 6 μs 6) voltage of pulse for discharge driving: 30 V 7) environmental condition: 30° C. 20% RH The procedures for image formation and evaluation are the same as those mentioned above in the test I.

The results are shown in Tables 2-1 to 2-3.

As mentioned above, whether or not the non-discharge operation is performed for a nozzle is preferably determined based on the relationship between color tone and pause time. An example thereof will be explained referring to FIG. 13. FIG. 13 is a graph illustrating the relationship between the color difference (between the first dot images and the continuously printed images) and the pause time during which ink drops are not discharged, when the images are recorded using the ink of Example 2 and the method of the test 2 under environmental conditions of 30° C. 20% RH and 20° C. 50% RH.

As can be understood from FIG. 13, when the pause time is greater than about 10 seconds, the color difference exceeds 5 under a condition of 30° C. 20% RH. In addition, when the pause time is greater than about 50 seconds, the color difference exceeds 5 under a condition of 20° C. 50% RH.

Figure 14:
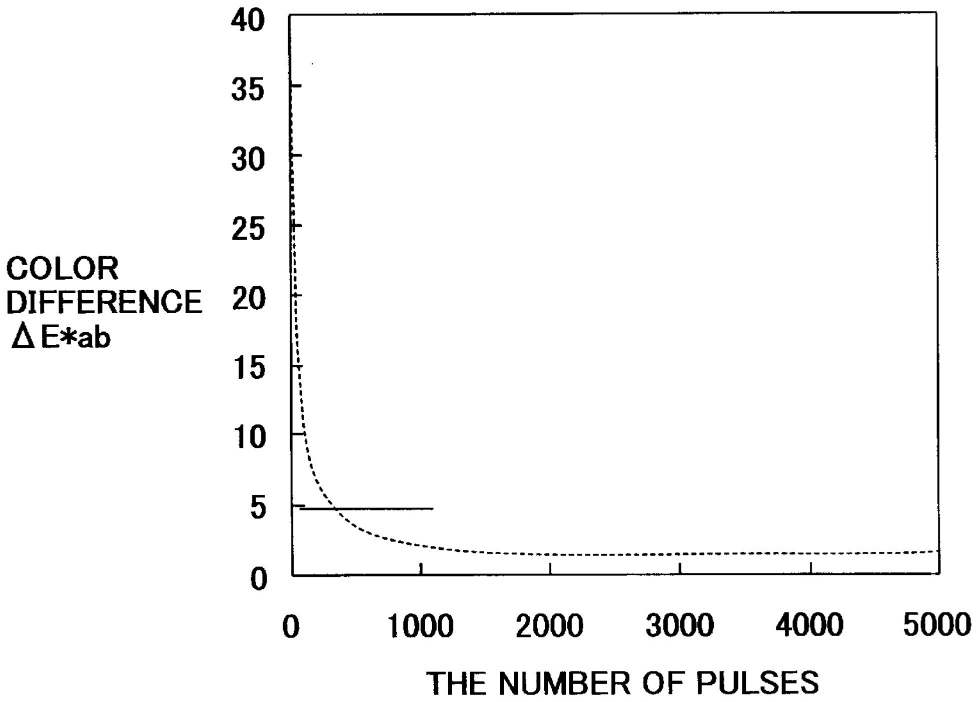
FIG. 14 is a graph for explaining how to determine the pulse number of the pulse to be applied in the non-discharge driving operation.

FIG. 14 is a graph for explaining how to determine the most suitable number of the pulses to be applied in the non-discharging operation when the environmental condition is 30° C. 20% RH and the pause time is 60 seconds. As can be under stood from FIG. 14, the number of the pulses applied for the non-discharging operation is preferably about 300.

TABLE 1-1

| | | | Head driving Condition | | | Continuously printing | | Printing after 5-sec idle scanning | |
|---|---|---|---|---|---|---|---|---|---|
| | Z1 (mV) | \|Z1\|-\|Z2\| (mV) | | Drive Mode | Pulse number | Dot density | Dot position | Dot density | Dot position |
| Ex. 1 | −40 | 3 | Ref. | ½ pulse | 0 | ⊚ | ○ | ○ | ○ |
| | | | Ex. | amplitude | 1000 | ⊚ | ○ | ⊚ | ○ |
| | | | | mode | 3000 | ⊚ | ○ | ⊚ | ○ |
| Comp. Ex. 1 | −13 | 2 | — | — | 0 | ⊚ | ○ | ⊚ | ○ |
| Comp. Ex. 2 | −17 | 10 | — | — | 0 | ⊚ | ○ | ⊚ | Δ |
| Comp. Ex. 3 | −16 | 8 | — | — | 0 | ⊚ | ○ | ⊚ | Δ |
| Ex. 2 | −37 | 15 | Ref. | ½ pulse | 0 | ⊚ | ○ | ⊚ | ○ |
| | | | Ex. | amplitude | 1000 | ⊚ | ○ | ⊚ | ○ |
| | | | | mode | 3000 | ⊚ | ○ | ⊚ | ○ |
| Ex. 3 | −42 | 10 | Ref. | ⅓ pulse | 0 | ⊚ | ○ | ⊚ | ○ |
| | | | Ex. | width | 1000 | ⊚ | ○ | ⊚ | ○ |
| | | | | mode | 3000 | ⊚ | ○ | ⊚ | ○ |
| Ex. 4 | −38 | 12 | Ref. | ⅓ pulse | 0 | ⊚ | ○ | ○ | ○ |
| | | | Ex. | width | 1000 | ⊚ | ○ | ⊚ | ○ |
| | | | | mode | 3000 | ⊚ | ○ | ⊚ | ○ |

*Ref: this head driving condition is a reference condition.

**Ex: this head driving condition is included in the present invention.

TABLE 1-2

| | | | Head driving Condition | | | Printing after 10-sec idle scanning | | Printing after 30-sec idle scanning | |
|---|---|---|---|---|---|---|---|---|---|
| | Z1 (mV) | \|Z1\|-\|Z2\| (mV) | | Drive Mode | Pulse number | Dot density | Dot position | Dot density | Dot position |
| Ex. 1 | −40 | 3 | Ref. | ½ pulse | 0 | ○ | ○ | ○ | ○ |
| | | | Ex. | amplitude | 1000 | ⊚ | ○ | ⊚ | ○ |
| | | | | mode | 3000 | ⊚ | ○ | ⊚ | ○ |
| Comp. Ex. 1 | −13 | 2 | — | — | 0 | ΔΔ | Δ | ΔΔ | x |
| Comp. Ex. 2 | −17 | 10 | — | — | 0 | ΔΔ | x | xx | — |
| Comp. Ex. 3 | −16 | 8 | — | — | 0 | ΔΔ | x | xx | — |
| Ex. 2 | −37 | 15 | Ref. | ½ pulse | 0 | ○ | ○ | Δ | ○ |
| | | | Ex. | amplitude | 1000 | ⊚ | ○ | ⊚ | ○ |
| | | | | mode | 3000 | ⊚ | ○ | ⊚ | ○ |
| Ex. 3 | −42 | 10 | Ref. | ⅓ pulse | 0 | Δ | ○ | Δ | ○ |
| | | | Ex. | width | 1000 | ⊚ | ○ | ⊚ | ○ |
| | | | | mode | 3000 | ⊚ | ○ | ⊚ | ○ |
| Ex. 4 | −38 | 12 | Ref. | ⅓ pulse | 0 | ○ | ○ | Δ | ○ |
| | | | Ex. | width | 1000 | ⊚ | ○ | ⊚ | ○ |
| | | | | mode | 3000 | ⊚ | ○ | ⊚ | ○ |

TABLE 1-3

| | | | Head driving Condition | | | Printing after 60-sec idle scanning | | Printing after 90-sec idle scanning | |
|---|---|---|---|---|---|---|---|---|---|
| | Z1 (mV) | \|Z1\|-\|Z2\| (mV) | | Drive Mode | Pulse number | Dot density | Dot position | Dot density | Dot position |
| Ex. 1 | −40 | 3 | Ref. | ½ pulse | 0 | Δ | ○ | x | — |
| | | | Ex. | amplitude | 1000 | ○ | ○ | ○ | ○ |
| | | | | mode | 3000 | ⊚ | ○ | ○ | ○ |
| Comp. Ex. 1 | −13 | 2 | — | — | 0 | xx | — | xx | — |
| Comp. Ex. 2 | −17 | 10 | — | — | 0 | xx | — | xx | — |
| Comp. Ex. 3 | −16 | 8 | — | — | 0 | xx | — | xx | — |
| Ex. 2 | −37 | 15 | Ref. | ½ pulse | 0 | Δ | ○ | x | — |
| | | | Ex. | amplitude | 1000 | ⊚ | ○ | ⊚ | ○ |
| | | | | mode | 3000 | ⊚ | ○ | ⊚ | ○ |
| Ex. 3 | −42 | 10 | Ref. | ⅓ pulse | 0 | x | — | x | — |
| | | | Ex. | width | 1000 | ⊚ | ○ | ⊚ | ○ |
| | | | | mode | 3000 | ⊚ | ○ | ⊚ | ○ |
| Ex. 4 | −38 | 12 | Ref. | ⅓ pulse | 0 | Δ | ○ | x | — |
| | | | Ex. | width | 1000 | ⊚ | ○ | ⊚ | ○ |
| | | | | mode | 3000 | ⊚ | ○ | ⊚ | ○ |

TABLE 2-1

| | | | Head driving Condition | | Continuously printing | | Printing after 5-sec idle scanning | |
|---|---|---|---|---|---|---|---|---|
| | Z1 (mV) | \|Z1\|-\|Z2\| (mV) | | Pulse number | Dot density | Dot position | Dot density | Dot position |
| Ex. 1 | −40 | 3 | Ref. | 0 | ⊚ | ○ | ○ | ○ |
| | | | Ex. | 1000 | ⊚ | ○ | ⊚ | ○ |
| | | | | 3000 | ⊚ | ○ | ⊚ | ○ |
| Comp. Ex. 1 | −13 | 2 | — | 0 | ⊚ | ○ | ΔΔ | Δ |
| Comp. Ex. 2 | −17 | 10 | — | 0 | ⊚ | ○ | ΔΔ | x |
| Comp. Ex. 3 | −16 | 8 | — | 0 | ⊚ | ○ | ΔΔ | x |
| Ex. 2 | −37 | 15 | Ref. | 0 | ⊚ | ○ | ○ | ○ |
| | | | Ex. | 1000 | ⊚ | ○ | ⊚ | ○ |

TABLE 2-1-continued

| | Z1 (mV) | \|Z1\|-\|Z2\| (mV) | Head driving Condition | | Continuously printing | | Printing after 5-sec idle scanning | |
|---|---|---|---|---|---|---|---|---|
| | | | | Pulse number | Dot density | Dot position | Dot density | Dot position |
| | | | | 3000 | ⊚ | ○ | ⊚ | ○ |
| Ex. 3 | −42 | 10 | Ref. | 0 | ⊚ | ○ | ○ | ○ |
| | | | Ex. | 1000 | ⊚ | ○ | ⊚ | ○ |
| | | | | 3000 | ⊚ | ○ | ⊚ | ○ |
| Ex. 4 | −38 | 12 | Ref. | 0 | ⊚ | ○ | ○ | ○ |
| | | | Ex. | 1000 | ⊚ | ○ | ⊚ | ○ |
| | | | | 3000 | ⊚ | ○ | ⊚ | ○ |

TABLE 2-2

| | Z1 (mV) | \|Z1\|-\|Z2\| (mV) | Head driving Condition | | Printing after 10-sec idle scanning | | Printing after 30-sec idle scanning | |
|---|---|---|---|---|---|---|---|---|
| | | | | Pulse number | Dot density | Dot position | Dot density | Dot position |
| Ex. 1 | −40 | 3 | Ref. | 0 | Δ | ○ | x | — |
| | | | Ex. | 1000 | ⊚ | ○ | ⊚ | ○ |
| | | | | 3000 | ⊚ | ○ | ⊚ | ○ |
| Comp. Ex. 1 | −13 | 2 | — | 0 | ΔΔ | x | xx | — |
| Comp. Ex. 2 | −17 | 10 | — | 0 | xx | — | xx | — |
| Comp. Ex. 3 | −16 | 8 | — | 0 | xx | — | xx | — |
| Ex. 2 | −37 | 15 | Ref. | 0 | Δ | ○ | x | — |
| | | | Ex. | 1000 | ⊚ | ○ | ⊚ | ○ |
| | | | | 3000 | ⊚ | ○ | ⊚ | ○ |
| Ex. 3 | −42 | 10 | Ref. | 0 | Δ | ○ | x | — |
| | | | Ex. | 1000 | ⊚ | ○ | ⊚ | ○ |
| | | | | 3000 | ⊚ | ○ | ⊚ | ○ |
| Ex. 4 | −38 | 12 | Ref. | 0 | Δ | ○ | x | — |
| | | | Ex. | 1000 | ⊚ | ○ | ⊚ | ○ |
| | | | | 3000 | ⊚ | ○ | ⊚ | ○ |

TABLE 2-3

| | Z1 (mV) | \|Z1\|-\|Z2\| (mV) | Head driving Condition | | Printing after 60-sec idle scanning | | Printing after 90-sec idle scanning | |
|---|---|---|---|---|---|---|---|---|
| | | | | Pulse number | Dot density | Dot position | Dot density | Dot position |
| Ex. 1 | −40 | 3 | Ref. | 0 | x | — | x | — |
| | | | Ex. | 1000 | ○ | ○ | ○ | ○ |
| | | | | 3000 | ⊚ | ○ | ○ | ○ |
| Comp. Ex. 1 | −13 | 2 | — | 0 | xx | — | xx | — |
| Comp. Ex. 2 | −17 | 10 | — | 0 | xx | — | xx | — |
| Comp. Ex. 3 | −16 | 8 | — | 0 | xx | — | xx | — |
| Ex. 2 | −37 | 15 | Ref. | 0 | x | — | x | — |
| | | | Ex. | 1000 | ⊚ | ○ | ⊚ | ○ |
| | | | | 3000 | ⊚ | ○ | ⊚ | ○ |
| Ex. 3 | −42 | 10 | Ref. | 0 | x | — | x | — |
| | | | Ex. | 1000 | ⊚ | ○ | ⊚ | ○ |
| | | | | 3000 | ⊚ | ○ | ⊚ | ○ |
| Ex. 4 | −38 | 12 | Ref. | 0 | x | ○ | x | — |
| | | | Ex. | 1000 | ⊚ | ○ | ⊚ | ○ |
| | | | | 3000 | ⊚ | ○ | ⊚ | ○ |

As can be understood from the Tables 1-1 to 2-3, the inkjet recording apparatus of the present invention can stably produce images having good image qualities without causing the clogging problem and without frequently performing maintenance operations such as idle-discharging operation.

This document claims priority and contains subject matter related to Japanese Patent Application No. 2001-083297, filed on Mar. 22, 2001, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An inkjet recording apparatus comprising:

(A) a recording head including, plural nozzles configured to selectively discharge a drop of an ink to form an image on a receiving material at an image forming area, and plural pressure generators configured to apply a pressure to corresponding nozzles of the plural nozzles;

(B) an ink container containing the ink, the ink including a pigment at a first pigment content, a volatile solvent and a solvent having a low volatility, and the ink having a pigment content decreasing property such that the pigment content decreases at a meniscus portion of the ink in the plural nozzles when the ink is allowed to settle; and (C) a driver configured to actuate at least one of the plural pressure generators by applying a first pulse to selectively discharge the ink from at least one of the plural nozzles, wherein the driver actuates at least one of the plural pressure generators at a predetermined timing by applying a second pulse such that the ink at the meniscus portion is vibrated to an extent such that the ink is not discharged from a corresponding nozzle of the plural nozzles, and further, wherein the ink further has a first zeta potential not less than 20 mV and a property that when due to evaporation of at least the volatile solvent a condensed ink is produced that has a second pigment content increases from 1.25 to 1.50 times the first pigment content, the condensed ink has a second zeta 5 potential, and an absolute value of the second zeta potential is less than an absolute value of the first zeta potential by at least 5 mV.

2. The inkjet recording apparatus according to claim 1, wherein the volatile solvent comprises water, and wherein the pigment of the ink comprises particles having a surface with which an ionic group is connected optionally with a connecting group therebetween.

3. The inkjet recording apparatus according to claim 1, wherein the plural nozzles have a diameter not greater than 25 $\mu$m.

4. The inkjet recording apparatus according to claim 1, wherein the inkjet recording apparatus satisfies the following relationship:

$$E/w \leqq 5\times10^{-8} \text{ (J/pg)}$$

where w represents a weight of ink drops discharged from the recording head to which an energy E is applied.

5. The inkjet recording apparatus according to claim 1, wherein each of the plural pressure generators comprises:

a vibrating plate; and an electrode opposing the vibrating plate, wherein the vibrating plate is deformed to generate pressure by utilizing an electrostatic force induced between the vibrating plate and the electrode.

6. The inkjet recording apparatus according to claim 1, further comprising:

a relative humidity detector configured to detect a relative humidity of environment surrounding the inkjet recording apparatus, wherein the predetermined timing of actuating the at least one of the plural pressure generators is determined based on the relative humidity and the pigment content decreasing property of the ink.

7. The inkjet recording apparatus according to claim 1, wherein the second pulse configured to actuate the at least one of the plural pressure generators is performed at least just before the first pulse configured to actuate the at least one of the plural pressure generators, and wherein the number of the second pulse is from 10 to 5,000.

8. The inkjet recording apparatus according to claim 1, wherein a number of the second pulse is determined based on at least one of a pause time of the plural nozzles during which the plural nozzles have not discharged the ink and a condition of an environment surrounding the inkjet recording apparatus.

9. The inkjet recording apparatus according to claim 1, further comprising an idle-discharging mechanism configured to dispose of the ink in the plural nozzles at a location other than the image forming area.

10. The inkjet recording apparatus according to claim 9, wherein the idle-discharging mechanism performs an ink disposing operation at an interval not less than 60 seconds.

11. An inkjet ink composition comprising:

a pigment at a first pigment content;

a volatile solvent; and a solvent having a low volatility, wherein the inkjet ink composition has a first zeta potential not less than 20 mV, the inkjet ink composition further has a property that due to evaporation of at least the volatile solvent a condensed ink is produced that has a second pigment content that increases from 1.25 to 1.50 times the first pigment content, the condensed ink has a second zeta potential, and an absolute value of the second zeta potential is less than an absolute value of the first zeta potential by at least 5 mV.

12. The ink composition according to claim 11, wherein the volatile solvent comprises water, and wherein the pigment comprises particles having a surface with which an ionic group is connected optionally with a connecting group therebetween.

13. The ink composition according to claim 12, wherein the ionic group is a cationic group selected from the group consisting of quaternary ammonium groups, quaternary alkylamine salt groups, pyridinium groups and phosphonium groups.

14. The ink composition according to claim 12, wherein the ionic group is an anionic group selected from the group consisting of —COOH, —$SO_3M$, —$PO_3M$, and —$PO_3M_2$, wherein M represents one of a hydrogen atom, an alkali metal, a quaternary ammonium group, a quaternary phosphonium group and an alkanol amine group.

15. An ink cartridge comprising:

an ink container containing an ink, a composition of the ink including a pigment at a first pigment content, a volatile solvent, and a solvent having a low volatility, wherein the inkjet ink composition has a first zeta potential not less than 20 mV, the inkjet ink composition further has a property that due to evaporation of at least the volatile solvent a condensed ink is produced that has a second pigment content that increases from 1.25 to 1.50 times the first pigment content, the condensed ink has a second zeta potential, and an absolute value of the second zeta potential is less than an absolute value of the first zeta potential by at least 5 mV.

16. The ink cartridge according to claim 15, further comprising a recording head comprising nozzles configured to discharge a drop of the ink to form an image on a receiving material, wherein the nozzles have a diameter not greater than 25 $\mu$m.

17. A color ink set comprising:

a yellow color ink;

a magenta color ink;

a cyan color ink; and a black color ink, wherein each of the yellow, magenta, cyan and black color inks includes, a pigment at a first pigment content, the pigment including particles having a surface with which an ionic group is connected optionally with a connecting group therebetween;

a volatile solvent; and a solvent having a low volatility, wherein each of the yellow, magenta, cyan and black color inks has a first zeta potential not less than 20 mV, each of the yellow, magenta, cyan and black color inks further has a property that due to evaporation of at least the volatile solvent a condensed ink is produced that has a second pigment content that increases from 1.25 to 1.50 times the first pigment content, the condensed ink has a second zeta potential, and an absolute value of the second zeta potential is less than an absolute value of the first zeta potential by at least 5 mV.

18. The color ink set according to claim 17, wherein the ionic group connected with the surface of the pigment of the black ink has a polarity different from a polarity of the ionic groups connected with the surfaces of the pigments of the yellow, magenta and cyan inks.

19. An inkjet recording method comprising:

selectively discharging an ink from at least one of plural nozzles to form an image on a receiving material and selectively vibrating the ink at a meniscus portion of at least one of the plural nozzles to an extent such that the ink is not discharged from the plural nozzles, wherein a composition of the ink includes a pigment at a first pigment content, a volatile solvent, and a solvent having a low volatility, and the ink has a pigment content decreasing property such that the pigment content decreases at a meniscus portion of the ink in the plural nozzles when the ink is allowed to settle, and further, wherein the ink further has a property that when the ink is condensed due to evaporation of at least the volatile solvent, a condensed ink is produced that has a second pigment content 25 increases from 1.25 to 1.50 times the first pigment content, the condensed ink has a second zeta potential, and an absolute value of the second zeta potential is less than an absolute value of the first zeta potential by at least 5 mV.

20. The inkjet recording method according to claim 19, wherein the volatile solvent comprises water, and wherein the pigment of the ink comprises particles having a surface with which an ionic group is connected optionally with a connecting group therebetween.

* * * * *